(12) United States Patent
Chan et al.

(10) Patent No.: US 12,481,771 B2
(45) Date of Patent: Nov. 25, 2025

(54) SYSTEM AND METHOD FOR OPERATING A SECURE DATABASE

(71) Applicant: The Ethical Identity Company, Round Rock, TX (US)

(72) Inventors: Jonathan Chan, Round Rock, TX (US); Travis Howe, Lexington, KY (US)

(73) Assignee: The Ethical Identity Company, Round Rock, TX (US)

( * ) Notice: Subject to any disclaimer, the term of this patent is extended or adjusted under 35 U.S.C. 154(b) by 58 days.

(21) Appl. No.: 18/694,929

(22) PCT Filed: Sep. 19, 2022

(86) PCT No.: PCT/US2022/044035
§ 371 (c)(1),
(2) Date: Mar. 22, 2024

(87) PCT Pub. No.: WO2023/049080
PCT Pub. Date: Mar. 30, 2023

(65) Prior Publication Data
US 2024/0403448 A1 Dec. 5, 2024

Related U.S. Application Data

(60) Provisional application No. 63/248,040, filed on Sep. 24, 2021.

(51) Int. Cl.
*G06F 21/60* (2013.01)
*H04L 9/00* (2022.01)
*H04L 9/08* (2006.01)

(52) U.S. Cl.
CPC .......... *G06F 21/602* (2013.01); *H04L 9/0869* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2006/0085651 A1* | 4/2006 | Staddon | G06F 21/6227 713/193 |
| 2011/0173455 A1* | 7/2011 | Spalka | H04L 9/0869 713/189 |
| 2019/0245683 A1* | 8/2019 | Narayanan | H04L 9/0825 |
| 2020/0084026 A1 | 3/2020 | Reading et al. | |
| 2020/0092088 A1 | 3/2020 | Novotny et al. | |
| 2020/0327100 A1 | 10/2020 | Androulaki et al. | |
| 2020/0366659 A1 | 11/2020 | Yu | |

(Continued)

OTHER PUBLICATIONS

PCT International Search Report and Written Opinion dated Jan. 24, 2023, PCT International Application No. PCT/US22/44035, pp. 1-13.

(Continued)

*Primary Examiner* — Raqiul A Choudhury
(74) *Attorney, Agent, or Firm* — Resolute Legal PLLC

(57) ABSTRACT

Various implementations of a system and method may include a secure database that can be structured with a strong emphasis on individual entity permissions and enforcement of read, write, and audit policies relative to individual database record entries to close security and privacy gaps that exist in current database systems.

14 Claims, 17 Drawing Sheets

(56) References Cited

U.S. PATENT DOCUMENTS

2020/0403803 A1* 12/2020 Werner ................ H04L 9/3242
2021/0051008 A1   2/2021 Li et al.
2021/0110049 A1   4/2021 Kumar et al.
2022/0141003 A1*  5/2022 Srivastava ......... G06Q 20/3821
                                                      713/171

OTHER PUBLICATIONS

Extended European Search Report dated Jun. 17, 2025, European Patent Application No. 22873466.1, pp. 1-7.

* cited by examiner

ACTIVE/AUDIT NODE: Validate Entity Data Request

SYSTEM AND METHOD FOR OPERATING A SECURE DATABASE

FIELD OF THE DISCLOSURE

Some implementations of the disclosure relate to systems, servers, methods, and devices for computing providing enhanced functionality over the prior art. More specifically, some implementations of the disclosure relate to systems, servers, methods, and devices for operating a secure database.

BACKGROUND

Standard database systems do not have privacy and data usage policies enforced in the core database systems operations. Many current database systems are deficient in this respect because they are designed with an assumption that an entity or organization that owns a database has full ownership and rights to all the data record entries stored in the database. This leads to privacy, data usage policies, and encryption schemes for some database systems that may be at least partially built into an application layer that is separate from the core database system, which may lead to access to some of the columns, tables, or even full databases through credentials given to system, application, administrative, and other users. In other database systems, privacy policies, data usage policies, and encryption schemes are not granular enough to provide accountability and transparency to entities that own stored data record entries. These broad privacy policies, data usage policies, and encryption schemes span data record entries that belong to or are associated with multiple different entities. These broad privacy policies, data usage policies, and encryption schemes provide no accountability or enforcement on individual data record entries once a system, application, administrator, or other user gains access to the current database systems. It is left to the application, administrator, or data analyst to build proper privacy policies, data usage policies, and encryption schemes into an application layer, which can be separate in some database systems. In some database systems, a data analyst may directly access the data in the database, where privacy and data usage policies are merely provided through operational policies and guidelines that are difficult to enforce. The separation of privacy, data usage policies, and encryption schemes in current database systems provide a potential attack vector for malicious actors to bypass application level security and utilize the application or system database credentials to access private data stored in current database systems. Additionally, audited usage of data record entries at the core database systems level is not available and cannot be reported to the entities that own or are associated with the data record entries stored in the secure database. Administrators or analysts in current database systems may violate privacy policies by accessing database entries without permission. Entities that own individual data records may never find out about the violation of privacy policies because such entities that own individual data records have little visibility to actions by current database system administrators or analysts. A more secure database is desired to correct the shortcomings of current database systems.

BRIEF SUMMARY

In some implementations, a secure database can be structured with a strong emphasis on individual entity permissions and enforcement of read, write, and audit policies relative to individual database record entries to close security and privacy gaps that exist in current database systems. In some implementations, the secure database can be utilized as a primary holder of data record entries and that use of such data would be through core systems of the secure database. In some implementations, when used in this configuration, the secure database can provide a framework for an entity's data to behave more similarly to personal property, which may include having some of the following properties: that the owning entity's or owning entities' personal data is clearly demarcated and accessible to the owning entity within the system; the owning entity can control or consent to the usage of the owning entity's data; and the owning entity can receive an audit or log of who or what has accessed or otherwise utilized the owning entity's data and when the owning entity's data has been accessed or otherwise utilized. In some implementations, by giving entities the ability to exercise ownership of their data, the secure database enables more forms of data to be safely digitized.

In some aspects, the techniques described herein relate to an active node of a secure database system, including: at least one processor; and at least one memory that stores computer executable instructions, wherein, when the computer executable instructions are executed by the at least one processor, the at least one processor is configured to: receive a request to store a private data record; encrypt the private data record with a first randomly generated data key to result in an encrypted private data record; encrypt the first randomly generated data key using a first type of encryption and a second randomly generated data key to result in a first encrypted system access key; encrypt the second randomly generated data key using a second type of encryption to result in at least one second encrypted system access key, wherein the second type of encryption uses a public key from a randomly selected node of a plurality of nodes that, with the active node, form part of the secure database system; transmit the encrypted private data record to a plurality of nodes for validation; add the encrypted private data record to a datastore in the node based on validating that the encrypted private data record can be written to a datastore and receiving messages from the plurality of nodes that the encrypted private data record can be written to the datastore, wherein the datastore mirrors other datastores associated with respective nodes of the plurality of nodes; store the first encrypted system access key and the at least one second encrypted system access key in an external access key database; and enable decryption access to the encrypted private data record using the at least one second encrypted system access key based on consensus authorization with the plurality of nodes.

In some aspects, the techniques described herein relate to an active node, wherein the datastore is a blockchain ledger.

In some aspects, the techniques described herein relate to an active node, wherein encrypting the second randomly generated data key using a second type of encryption results in two second encrypted system access keys.

In some aspects, the techniques described herein relate to an active node, wherein the two second encrypted system access keys further include an encrypted active node system access key and an encrypted audit node system access key.

In some aspects, the techniques described herein relate to an active node, wherein the encrypted active node system access key and the encrypted audit node system access key contain different portions of second randomly generated data key.

In some aspects, the techniques described herein relate to an active node, wherein the encrypted active node system access key is encrypted with a public key associated with the active node.

In some aspects, the techniques described herein relate to an active node, wherein the first encrypted system access key, the encrypted active node system access key, and the encrypted audit node system access key include an external access key, wherein the external access key is stored in the external access key database.

In some aspects, the techniques described herein relate to an active node, wherein the external access key database is separate from the datastore, wherein records are permitted to be deleted from the external access key database, and wherein entries in the datastore are not permitted to be deleted form the datastore.

In some aspects, the techniques described herein relate to an active node, wherein the request to store the private data record is logged.

In some aspects, the techniques described herein relate to an active node, wherein the request to store the private data record is logged in the datastore, wherein the datastore is a blockchain ledger.

In some aspects, the techniques described herein relate to a method of operating a secure database system, including: receiving a request to store a private data record; encrypting the private data record with a first randomly generated data key to result in an encrypted private data record; encrypting the first randomly generated data key using a first type of encryption and a second randomly generated data key to result in a first encrypted system access key; encrypting the second randomly generated data key using a second type of encryption to result in at least one second encrypted system access key, wherein the second type of encryption uses a public key from a randomly selected node of a plurality of nodes that, with the active node, form part of the secure database system; transmitting the encrypted private data record to a plurality of nodes for validation; adding the encrypted private data record to a datastore in the node based on validating that the encrypted private data record can be written to a datastore and receiving messages from the plurality of nodes that the encrypted private data record can be written to the datastore, wherein the datastore mirrors other datastores associated with respective nodes of the plurality of nodes; storing the first encrypted system access key and the at least one second encrypted system access key in an external access key database; and enabling decryption access to the encrypted private data record using the at least one second encrypted system access key based on consensus authorization with the plurality of nodes.

In some aspects, the techniques described herein relate to a method, wherein the datastore is a blockchain ledger.

In some aspects, the techniques described herein relate to a method, wherein encrypting the second randomly generated data key using a second type of encryption results in two second encrypted system access keys.

In some aspects, the techniques described herein relate to a method, wherein the two second encrypted system access keys further include an encrypted active node system access key and an encrypted audit node system access key.

In some aspects, the techniques described herein relate to a method, wherein the encrypted active node system access key and the encrypted audit node system access key contain different portions of second randomly generated data key.

In some aspects, the techniques described herein relate to a method, wherein the encrypted active node system access key is encrypted with a public key associated with the active node.

In some aspects, the techniques described herein relate to a method, wherein the first encrypted system access key, the encrypted active node system access key, and the encrypted audit node system access key include an external access key, wherein the external access key is stored in the external access key database.

In some aspects, the techniques described herein relate to a method, wherein the external access key database is separate from the datastore, wherein records are permitted to be deleted from the external access key database, and wherein entries in the datastore are not permitted to be deleted form the datastore.

In some aspects, the techniques described herein relate to a method, wherein the request to store the private data record is logged.

In some aspects, the techniques described herein relate to a method, wherein the request to store the private data record is logged in the datastore, wherein the datastore is a blockchain ledger.

In some aspects, the techniques described herein relate to a machine-readable medium carrying machine readable instructions, which when executed by a processor of a machine, causes the machine to carry out the method of any one of the prior paragraphs.

DETAILED DESCRIPTION

Figure 1:
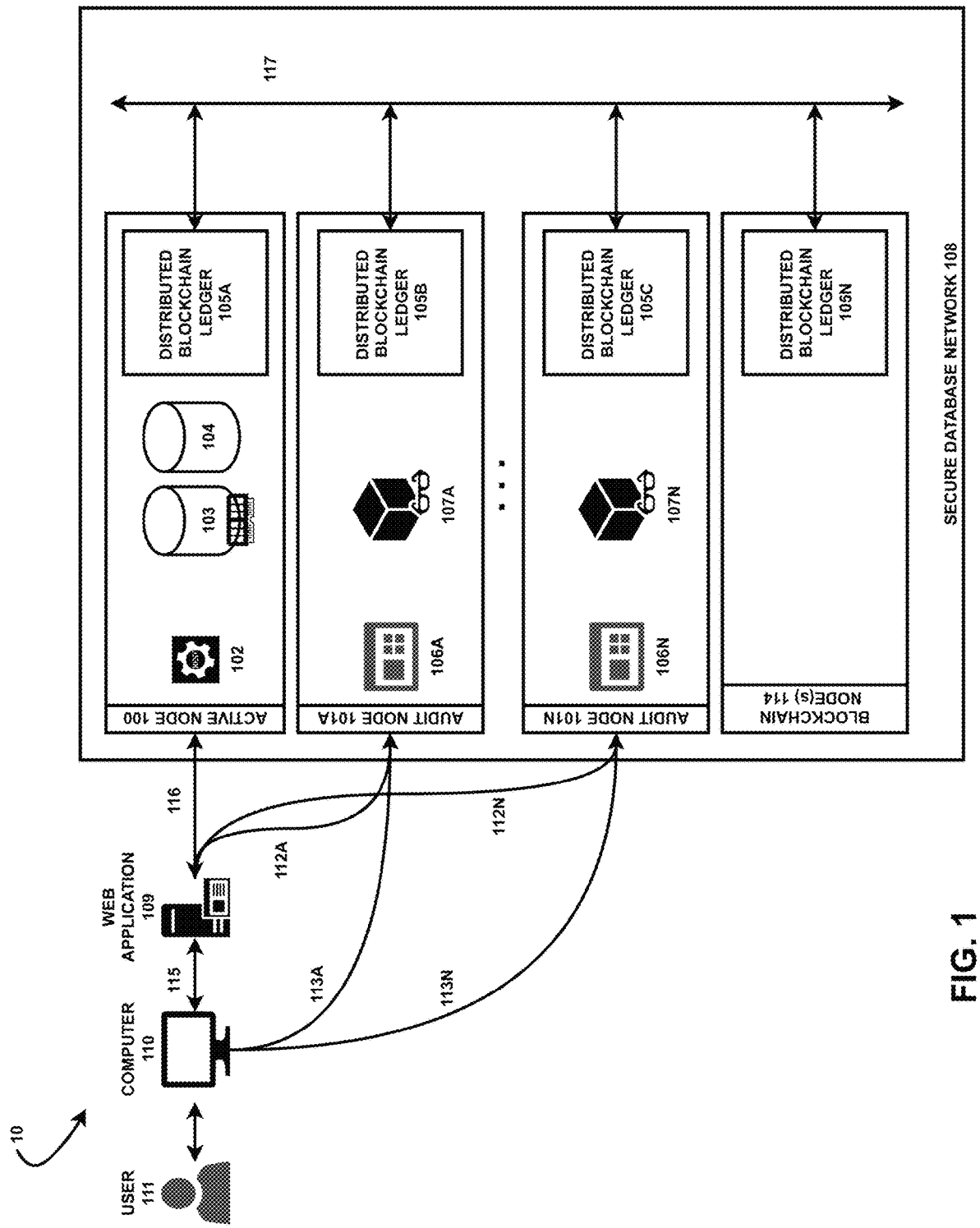
FIG. 1 is a block diagram illustrating a secure database system according to some implementations of the disclosure.

In some implementations, the secure database system is a privacy-oriented secure database system. In some implementations, the secure database system provides a framework for the storage and utilization of privately owned data, assignment of data ownership, permissions or consent of access of private data, audit, compliance, and oversight.

In some implementations, entities that read, write, or store data within the secure database system can be defined within the secure database. In some implementations, individual entries of data in the secure database can be defined as created by an existing entity in the database and be assigned to an entity that owns or controls the individual entries in the secure database. In some implementations, unowned data is not allowed to be stored within the secure database. In some implementations, the secure database system may store public data and private data. In some implementations, the public data can be stored unencrypted in the secure database. In some implementations, private data can be stored encrypted in the secure database in such a manner that owning entities with the correct decryption key can be allowed easier access to the owning entity's data than an entity that does not own the data. In some implementations, non-owning entities that are granted access to an owning entity's data may utilize an audited data request system that may use two or more nodes in the secure database to generate decryption keys to access the owning entity's data. In some implementations, the nodes in the secure database can provide data governance and can help fulfill the compliance and oversight of the secure database system. In some implementations, the secure database system can be highly configurable to represent a wide range of data ownership scenarios. In some implementations, database schemas can be configured in the secure database system to define what public and private data an entity is permitted to own and control, which entities are permitted to write data into the secure database, and which entities are permitted to make data requests for the private data of a particular entity.

In some implementations, the secure database system utilizes blockchain and encryption technology to create a secure database. In some implementations, the secure database system may include unique system elements to create the secure database. The secure database elements may include, but are not limited to, an entity, a classification, a subject, a subject schema, an entry, an endorser, a private entry, a public entry, an entity public record, and an entity private record. Some of the features of these unique system elements are described below.

In some implementations, an entity in the secure database system can be configured to read, write, or own data record entries (or data entries or entries) within the secure database system. In some implementations, an entity may include an association with an entity ID and a classification. In some implementations, an entity ID is a unique identifier associated with the entity. In some implementations, the classification can be an identifier of the type of classification that the entity belongs to. The classification can be utilized to determine which classification to utilize when validating operations (reading or writing data) for a particular entity. In some implementations, an entity may include an associated public key utilized to encrypt decryption keys for private data stored in the secure database system. In some implementations, entities can own entries in the secure database and have public and private records entries in the secure database.

In some implementations, a classification defines what public and private subjects may be associated with an entity and how different entities interact with entity owned data. In some implementations, an entity is associated with a classification. In some implementations, a classification may also store code snippets or functions that are executed during a data request or a data write operation to determine whether the data request or data write operation are permitted (e.g., rules that control how entities are permitted to read and/or write data in the secure database system).

In some implementations, a subject defines the format of the data allowed to be stored in an entry through the subject schema; whether the entry would be stored as an encrypted private entry or stored as an unencrypted public entry; and how the entries of the same subject associated with the same entity should be merged together to form the entity record.

In some implementations, an entry or entries (also referred to herein as data entries or data record entries) in the secure database system can be a unit of data stored within the secure database. In some implementations, an entry can be akin to a relational database row. In some implementations, one or more entries can be merged together to form an entity record (e.g., an entity public record or an entity private record). In some implementations, the secure database system can be configured to associate an entry with an endorser and an entity. In some implementations, the secure database system may validate an entry against a subject schema.

In some implementations, an endorser in the secure database system can be an entity that is responsible for adding an entry to the secure database. In some implementations, the secure database system may enable an endorser to utilize public key signing to sign an entry prior to adding the entry to the secure database. In some implementations, the endorser adding an entry to the secure database may not be the same entity that owns the entry being added to the secure database.

In some implementations, a subject is associated with an entry in the secure database system. In some implementations, a subject indicates to the secure database system which subject schema to utilize to validate an entry. In some implementations, the secure database system is configured to control how an entry is merged with other entries and represented in an entity record (e.g., an entity public record or an entity private record) based on the subject associated with an entry and the instructions stored in the subject. In some implementations, the secure database system controls how an entry is saved and stored in a blockchain ledger of the secure database system based on rules defined in the subject schema associated with an entry through the subject. In some implementations, a subject also defines if an entry is stored on the blockchain publicly and unencrypted or privately and encrypted.

In some implementations, private entries are entries in the secure database system that can be encrypted before being stored in the blockchain ledger of the secure database system. In some implementations, private entries can be stored in a non-blockchain ledger datastore. In some implementations, private entries are accessible by an owning entity (e.g., an entity that owns the entry) or by non-owning entities that are permitted by the owning entity to access the private entries. In some implementations, the non-owning entity may use a specialized data request in the secure database system to access the private entries owned by a different owning entity. In some implementations, non-owning entities can be permitted to access private entries based on rules defined in a classification for data access. For example, rules can be defined by rule schemes such as, but not limited to, access control lists or role-based lists (e.g., doctors are allowed to access data of their patients).

In some implementations, public entries are entries that are stored in plaintext in the blockchain ledger of the secure database system. In some implementations, public entries are readable by any entity with access to the blockchain ledger of the secure database system.

In some implementations, an entity public record is one or more public entries (e.g., entries that are public) that the secure database system merges together based on rules defined in their associated respective subjects. In some implementations, the entity public records can be freely accessible to read by entities with access to the secure database system.

In some implementations, an entity private record is one or more private entries (e.g., entries that are private) that the secure database system merges together based on their associated respective subjects. In some implementations, the entity private records are accessible after decrypting the private entries by the owning entity with the proper decryption key or through the specialized data request in the secure database system to access the private entries owned by a different owning entity.

In some implementations, the secure database system may use multiple distributed nodes that are in communication with each other to provide governance and auditing of the secure database system. In some implementations, the secure database system may use distributed applications ("DApps") to define how data is read, written, stored, and communicated among nodes within the secure database system. In some implementations, the secure database system may maintain integrity of the secure database by preventing data from being altered outside the rules of the database schema defined in the DApps. In some implementations, the secure database system may be configured such that entries in the secure database can be immutable in a distributed ledger. In some implementations, one or more types of data access requests in the secure database system are recorded in the distributed ledger of the secure database system. In some implementations, the secure database system provides auditing by recording data access requests for entities or entries associated with entities on the distributed blockchain ledger of the secure database system. In some implementations, the data access requests in the secure database system can be initiated and responded to using a distributed ledger. That is, in some implementations, data access requests and responses to the requests are written to a distributed ledger, which is distributed among the nodes of the secure database system. Thus, in implementations using the distributed ledger to initiate and respond to data access requests, an audit trail naturally is created for when requests are made for data access in the secure database system, reducing chances for backdoor access to private data without a written record of the access. Moreover, as will be discussed in more detail below, data access requests made outside of a process using the distributed ledger would be difficult without compromising multiple nodes of the secure database system (e.g., to obtain the encryption keys to enable access to the requested data), which increases the security of the secure database system.

FIG. 1 illustrates an example environment 10 for implementing aspects of the disclosure in accordance with implementations of a secure database system. In some implementations, the secure database of the secure database system includes features of a blockchain network. In some implementations, the secure database system comprises one or more nodes of a blockchain network. Traditional databases rely on application-level security, which can expose the entire database if the application-level security is hacked or bypassed. Unlike traditional databases, the secure database can enforce security down to the data storage layer. For example, in some implementations, individual entries in the secure database can be encrypted in such a manner that the ability to perform decryption on the individual encrypted entries can be spread between one or more nodes of a blockchain network. In some implementations, even if access is gained to one encrypted entry in the secure database, the access does not necessarily provide access to other encrypted entries in the secure database. In some implementations, by enabling encryption for individual entries in the secure database, the secure database can be configured without a master key to unlock all encrypted entries in the secure database. In some implementations, another aspect of the secure database may include using blockchain node communication for reading and/or writing one or more entries to the secure database. In some implementations, by using blockchain node communication for reading and/or writing some entries to the secure database, the secure database enables audit controls that can be extremely difficult to bypass.

In some implementations, the secure database may define stored data and entities that interact with the stored data in a particular manner. For example, in some implementations, the secure database may include entries. In some implementations, such entries can be stored in a blockchain ledger of one or more blockchain nodes of the blockchain network. Encrypted and unencrypted entries can co-exist on the same blockchain ledger. It should be appreciated that in some implementations, the same blockchain ledger may be replicated by one or more nodes of the blockchain network. In some implementations, the entries of the secure database can each be associated with an entity. In some implementations, an entity of the secure database can comprise of one or more entries in the secure database. In some implementations, an entity in the secure database can be associated with one or more metadata, such as a classification, an entity ID, a public key, and/or a private key. In some implementations, the secure database may also include an endorser. In some implementations, an endorser is an entity that may write and/or read data entries in the secure database.

The following is a brief example of an entry, an entity, and an endorser illustrated in a medical records system using the secure database. In some implementations, a medical records system may define a patient as an entity. In some implementations, basic information of the patient may be stored in the secure database (e.g., the patient's name, address, age, etc.). This patient information can be stored in one or more entries of the secure database that are associated with the patient (e.g., an entity). If the patient visits the doctor for a medical procedure, the doctor may record the medical procedure (e.g., a flu vaccination) as an entry in the secure database. The entry for the medical procedure can be associated with the entity (e.g., the patient). In some implementations, the doctor or a nurse may record the various entries in the secure database about the patient/entity. In some implementations, the doctor or nurse making the entries can be defined as the endorser writing the entries related to the entity into the secure database. Taking the example further, if a second doctor wanted to access the entries related to the entity, the entity (e.g., the patient) can authorize such access. In some implementations, access to the entries can be defined by rules stored in a classification associated with the entries. For example, in some implementations, a rule can be defined giving access to entities with the classification of "doctor" on an access control list stored in the entity's public entries. A request from the second doctor can be made to the patient for access and the patient may approve the request for access. In some implementations, the patient approves the second doctor's access in the secure database by adding the second doctor to the "allow list" of the access control list through submitting/writing a public entry to the secure database. In some implementations, by keeping the entity and endorser separate in the medical records secure database example, the patient can control when and how the doctor endorser can read and/or write entries related to the patient (entity). It should be appreciated that the secure database can be adapted for different uses and what is considered an entity or an endorser may change depending on the particular application of the secure database. For example, in a vote tracking system, the ballot, the voter, the vote counter, and the voter investigator may be the defined entities within the secure database. A voter can be an endorser that is given write permission to write an entry associated with a ballot. A vote counter may be an entity that has read access to tally ballot entries in the secure database, but the vote counter can be restricted from accessing the private voter information which would contain personal identifying information (PII) of the voter. An understanding of the entries, entities, and endorser will aid in the understanding of the encryption and decryption process described below in connection with FIG. 2-16b.

Returning to FIG. 1, although a web-based example environment is used for purposes of explanation, different environments may be used to implement various implementations of the disclosure. The example environment may include one or more electronic client devices or computers 110, which can include any appropriate device operable to send and/or receive requests, messages, or information over one or more appropriate networks and network connections, such as connections 113A to 113N (e.g., an nth connection) and 115, and, in some implementations, convey information back to the computer 110 associated with user 111. Examples of such client devices include personal computers, cell phones, handheld messaging devices, laptop computers, tablet computers, set-top boxes, personal data assistants, embedded computer systems, electronic book readers, and the like. The networks discussed herein can include any appropriate network, including an intranet, the Internet, a cellular network, a local area network, a satellite network, or any other such network and/or combination thereof. Components used for such a system can depend at least in part upon the type of network and/or environment selected. Suitable protocols and components for communicating via such a network can be used. Communication over the network can be enabled by wired or wireless connections and combinations thereof. In some implementations, the network includes the Internet and/or other publicly-addressable communications network.

In some implementations, the example environment 10, includes one or more web application servers 109 for receiving requests and serving content in response thereto. For some implementations, an alternative device serving a similar purpose can be used. The web application server 109 may send and/or receive requests, messages, or information over one or more appropriate networks and network connections, such as connections 116, 112A to 112N (e.g., an nth connection), and 115.

The illustrative example environment 10 may include a secure database network 108 that forms a secure database. In some implementations, the secure database network 108 includes one or more active nodes 100, one or more audit nodes 101 (e.g., audit nodes 101A-audit nodes 101N), and one or more blockchain nodes 114. In some implementations, the various nodes that form the secure database network 108 may be specially configured servers that execute processes that are discussed in greater detail below. In some implementations, active nodes 100, audit nodes 101, and blockchain nodes 114 work together to form the secure database by securely storing records in a distributed manner across the one or more of the various nodes. In some implementations, blockchain nodes 114 can be used to interoperate with one or more other blockchain networks. In some implementations, the one or more active nodes 100, one or more audit nodes 101, and one or more blockchain nodes 114 may communicate (e.g., send and/or receive requests, messages, or information) over one or more appropriate networks and network connections, such as network 117. In some implementations, network 117 can represent the communication that happens within the logical secure database network comprised of the one or more active nodes 100, the one or more audit nodes 101A-101N, and the one or more blockchain nodes 114. It should be appreciated that the secure database network may include any suitable number of other devices. In some implementations, the logical secure database network operates within a Wide Area Network (WAN) such as the Internet (e.g., nodes of the secure database are in communication with each other via the Internet or some other suitable network).

In some implementations, active node 100 may include data stores 103, 104, and distributed blockchain ledger 105A. In some implementations, data store 103 may be configured as an ephemeral data store, which temporarily stores information such as cryptographic keys that are used for a short period of time. In some implementations, information written into data store 103 may be associated with a time-to-live. In some implementations, when the time-to-live period expires, the information written into data store 103 can be deleted, overwritten, or rendered unusable. In some implementations, the data store 103 can be implemented in RAM or another suitable electronic storage device. In some implementations, data store 104 may be configured as an external access key database. For example, data store 104 may store one or more cryptographic keys and portions of cryptographic keys that can be used to unlock and access encrypted data stored in the distributed blockchain ledger 105A. Distributed blockchain ledger 105A is a data store of blocks of data that can be distributed and replicated by one or more other nodes that form part of the secure database network 108. In some implementations, active node 100 may include an application programming interface ("API") service 102. In some implementations, the API service 102 enables devices like computer 110 to securely read and write data to the secure database (e.g., through web application server 109 or through other suitable systems). In some implementations, distributed blockchain ledger 105A includes the blockchain ledger and blockchain application software used to access the blockchain ledger. While distributed blockchain ledger 105A is depicted as part of active node 100, in some implementations, distributed blockchain ledger 105A is not included as part of active node 100. In some implementations, active node 100 may communicate with distributed blockchain ledger 105A on one or more different devices. For example, in some implementations, distributed blockchain ledger 105A can be on a separate server. In such implementations, active node 100 may communicate with the separate server to access the features and functionality of distributed blockchain ledger 105A. In some implementations, active node 100 may access a blockchain ledger on a node such as audit node 101A, audit node 101N, and/or blockchain nodes 114, where the blockchain ledger on these other nodes may substantially mirror copies of the distributed blockchain ledger 105A.

As also illustrated in FIG. 1, in some implementations, secure database network 108 includes other nodes such as audit node 101A through audit node 101N (e.g., N being an nth audit node). These audit nodes 101A-101N may include data stores such as distributed blockchain ledger 105B, distributed blockchain ledger 105C to distributed blockchain ledger 105N (e.g., N being an nth distributed blockchain ledger). In some implementations, the distributed blockchain ledgers 105B-105N, like distributed blockchain ledger 105A, are data stores of blocks of data (e.g., entries in the secure database) that can be distributed and replicated by one or more other blockchain nodes (e.g., in their respective distributed blockchain ledgers) that form part of the secure database network 108. In some implementations, the distributed blockchain ledgers 105B-105N may include copies of the blockchain ledger and the application software used to access the blockchain ledger. Thus, it should be appreciated that in some implementations, distributed blockchain ledgers 105B, 105C to 105N may substantially mirror (at various times during operation of the secure database network 108) distributed blockchain ledger 105A. For example, as data is written to one of the distributed blockchain ledgers 105A, 105B, or 105C . . . 105N, such data is generally written to other distributed blockchain ledgers 105A-105N. In some implementations, one or more distributed blockchain ledgers 105A-105N may develop a discrepancy (e.g., data in the blocks of the ledger do not match) from the other distributed blockchain ledgers 105B, 105C . . . 105N. That is, if one or more nodes of the blockchain (e.g., one or more active nodes 100, one or more audit nodes 101A . . . 101N, and blockchain nodes 114) cannot reach a consensus in their respective distributed blockchain ledgers, the blockchain nodes (nodes with the blockchain ledgers 105A-105N) may execute a consensus process to determine which one or more of the existing distributed blockchain ledgers 105A-105N has the correct distributed blockchain ledger (e.g., using one or more consensus algorithms). In some implementations, the various blockchain nodes 100, 101A-101N, 114 in the secure database network 108 may use an agreed upon existing distributed blockchain ledger resident on one or more of the nodes. In some implementations, the agreed upon existing distributed blockchain ledger can be used to replace one or more of the blockchain ledgers on one or more of the nodes with a non-conforming blockchain ledger. In some implementations, the various distributed blockchain ledgers 105B, 105C, . . . , 105N may be stored separately (e.g., on a separate device) from the various blockchain nodes 100, 101A-101N, 114 shown in FIG. 1. In some implementations, one or more of the various secure database nodes 100, 101A-101N may communicate with a separate distributed blockchain ledger on a different device or node to access the blockchain ledger 105A, 105B, 105C, . . . 105N.

In some implementations, audit nodes 101A-101N may include a web application server 106A, 106B . . . 106N (e.g., an nth web application server) and an audit listener server 107A, 107B . . . 107N (e.g., an nth audit listener server). In some implementations, web application servers 106A, 106B . . . 106N are servers that can be configured to provide access, such as read access to the data stored in the distributed blockchain ledger (e.g., distributed blockchain ledger 105A). In some implementations, the web application server provides an API for access to the data in the distributed blockchain ledger. In some implementations, the web application server may provide its own visual interface for accessing the data in the distributed blockchain ledger. For example, the user 111 at computer 110 may request data stored on the secure database network 108 from nodes such as audit node 101A through connection 113A. Depending on the system requirements, the web application server 106A may enable users to access an entry or block of the distributed blockchain ledger of the secure database network 108. In some implementations, web application server 106A could be configured to limit access, such as verifying data requests and entries/blocks in the blockchain ledger. In some implementations, audit listener servers 107A, 107B . . . 107N can monitor the secure database network 108 for data requests (at its respective node, such as audit node 101A), evaluate if the data requested is permitted, decrypt audit keys that are used to access data stored in the distributed blockchain ledger, and can write audit data to the distributed blockchain ledger generated in response to data access requests at any of active node 100 or one or more audit nodes 101A-101N.

It should be understood that there can be several application servers, layers, or other elements, processes, or components, which may be chained or otherwise configured, which can interact to perform tasks such as obtaining data from an appropriate data store in the secure database network 108. Servers, as used herein, may be implemented in various ways, such as specially configured hardware devices or specially configured virtual computer systems. In some contexts, servers may refer to specially configured programming modules being executed on a computer system. As used herein, unless otherwise stated or clear from context, the term "data store" refers to any device or combination of devices capable of storing, accessing, and retrieving data. In some implementations, the data store may include any combination and number of data servers, databases, data storage devices, and data storage media, in any standard, distributed, virtual, or clustered environment. The servers can include any appropriate hardware, software, and firmware for integrating with the data store as needed to execute aspects of one or more applications for the client device, handling some or all of the data access and business logic for an application. The servers may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of requests and responses, as well as the delivery of content between the client device or computer 110 and the web application server 109, can be handled by a web server using Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The datastores 103, 104, and 105A-105N can include several separate data tables, databases, data documents, dynamic data storage schemes, and/or other data storage mechanisms and media for storing data relating to a particular aspect of the present disclosure. For example, the data store illustrated may include mechanisms for storing various data and user information, which can be used to secure content and serve content. The data store also is shown to include a mechanism for storing log data, such as blockchain ledger data, which can be used for reporting, analysis, or other such purposes. It should be understood that there can be many other aspects that may need to be stored in the data store, such access rights information, which can be stored in the above listed mechanisms as will be described in more detail below. In some implementations, the datastores can be operable, through logic associated therewith, to receive instructions from the web application server 109 and obtain, update, or otherwise process data in response thereto. The web application server 109 may provide static, dynamic, or a combination of static and dynamic data in response to the received instructions. Dynamic data, such as data used in web logs (blogs), shopping applications, news services, and other such applications may be generated by server-side structured languages, as described herein, or may be provided by a content management system ("CMS") operating on, or under the control of, the application server. In one example, a user, through a device operated by the user, might submit a search request for a certain type of item. In some implementations, the data store might access the user information to verify the identity of the user and whether the user can access data that is requested. The information then can be returned to the user, such as in a results listing on a web page that the user is able to view via a browser on the user's computer 110. Information for a particular item of interest can be viewed in a dedicated page or window of the browser. It should be noted, however, that implementations of the present disclosure are not necessarily limited to the context of webpages, but may be more generally applicable to processing requests in general, where the requests are not necessarily requests for content.

Server may include an operating system that provides executable program instructions for the general administration and operation of that server and may include a computer-readable storage medium (e.g., a hard disk, random access memory, read only memory, etc.) storing instructions that, when executed (e.g., as a result of being executed) by a processor of the server, allow the server to perform its intended functions.

The example environment 10, in some implementations, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 10 in FIG. 1 should be taken as being illustrative in nature and not limited to the scope of the disclosure.

The various implementations further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dumb terminals, thin-clients, gaming systems, and other devices capable of communicating via a network. These devices also can include virtual devices such as virtual machines, hypervisors, and other virtual devices capable of communicating via a network.

Various implementations of the present disclosure utilize at least one network that would be familiar to those skilled in the art for supporting communications using any of a variety of commercially available protocols, such as, but not limited to, Transmission Control Protocol/Internet Protocol ("TCP/IP"), User Datagram Protocol ("UDP"), protocols operating in various layers of the Open System Interconnection ("OSI") model, and/or Transport Layer Security ("TLS"). The networks can be, for example, a local area network, a wide-area network, a virtual private network, the Internet, an intranet, an extranet, a public switched telephone network, an infrared network, a wireless network, a satellite network, and any combination thereof. In some implementations, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols.

In some implementations, the server(s) can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java, C, C#, or C++ or any scripting language, such as Ruby, PHP, Perl, Python, or TCL, as well as combinations thereof. The server(s) may also include database servers, including without limitation, such as MySQL™, Postgres™, SQLite™, MongoDB™, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. Similarly, files for performing the functions attributed to the computers, servers, or other network devices may be stored locally and/or remotely, as appropriate. Where a system includes computerized devices, such devices can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc. Such devices also can include a computer-readable storage media reader, a communications device (e.g., a modem, a network card, an infrared communication device, etc.), and working memory, as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices may include one or more software applications, modules, services, or other elements located within at least one working memory device, including an operating system and application programs, such as a client application or web browser. In addition, customized hardware might also be used and/or particular elements might be implemented in hardware, software, or both. Further, connection to other computing devices such as network input/output devices may be employed.

Storage media and computer readable media for containing code, or portions of code, can include any appropriate media, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, digital versatile disk (DVD), or other optical storage, magnetic cassettes, magnetic tape, magnetic disk storage, or other magnetic storage devices or any other medium which can be used to store the desired information and which can be accessed by the system device.

FIGS. 2-7 illustrate example processes of securely receiving, validating, and writing data entries to a secure database of the secure database network 108. In some implementations where data entries do not need to be encrypted, the secure database may use other suitable methods to write data entries to the secure database.

Figure 2:
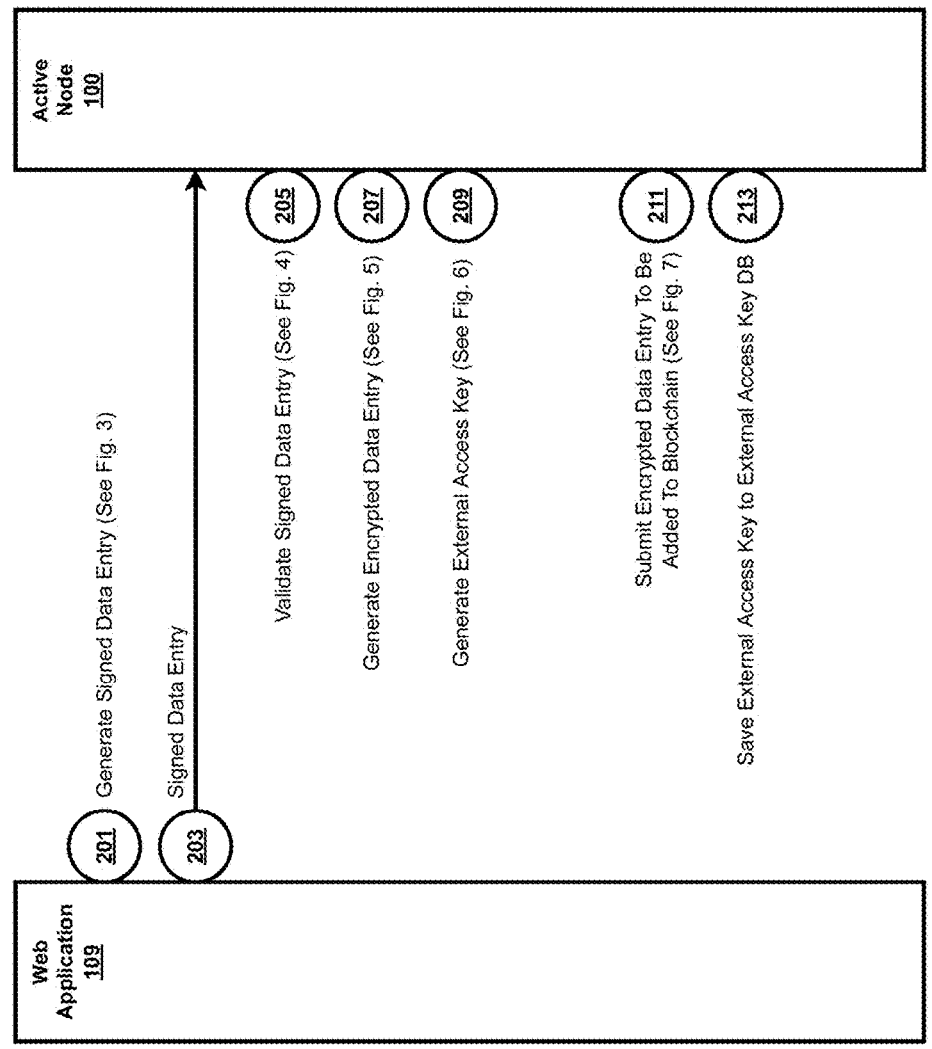
FIG. 2 is a block diagram of different systems and a high level message flow between the different systems according to some implementations of the disclosure.
Figure 3:
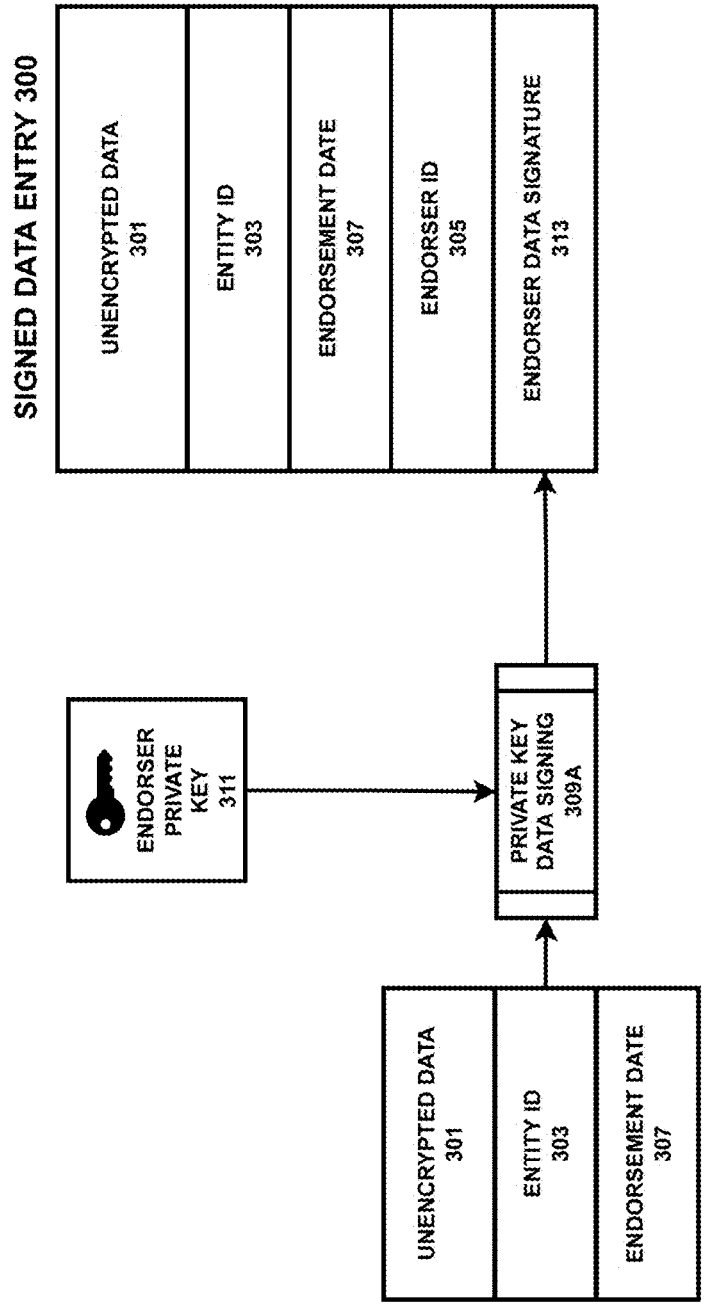
FIG. 3 is a flowchart of a method for signing entry data into a secure database according to some implementations of the disclosure.
Figure 4:
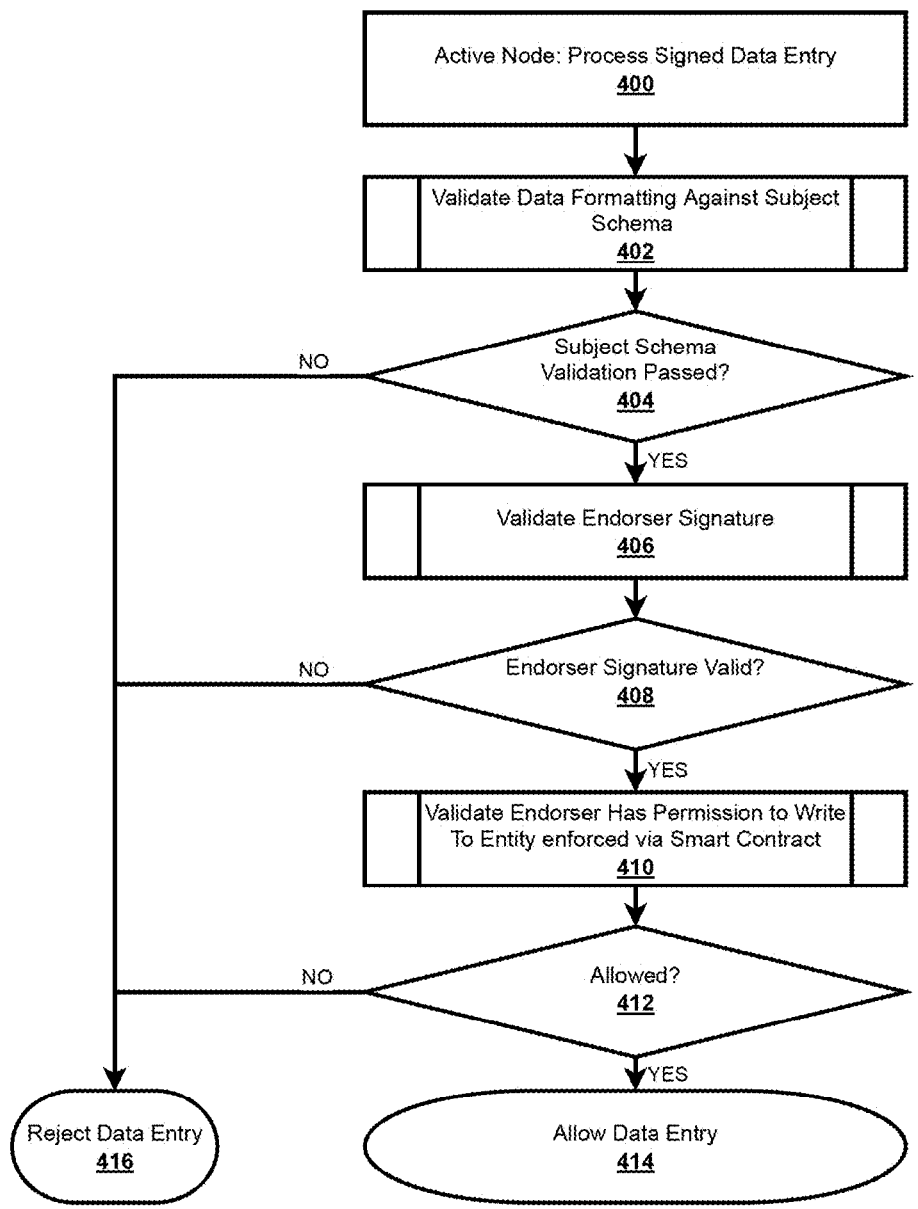
FIG. 4 is a flowchart of a method for validating data entry into a secure database according to some implementations of the disclosure.
Figure 5:
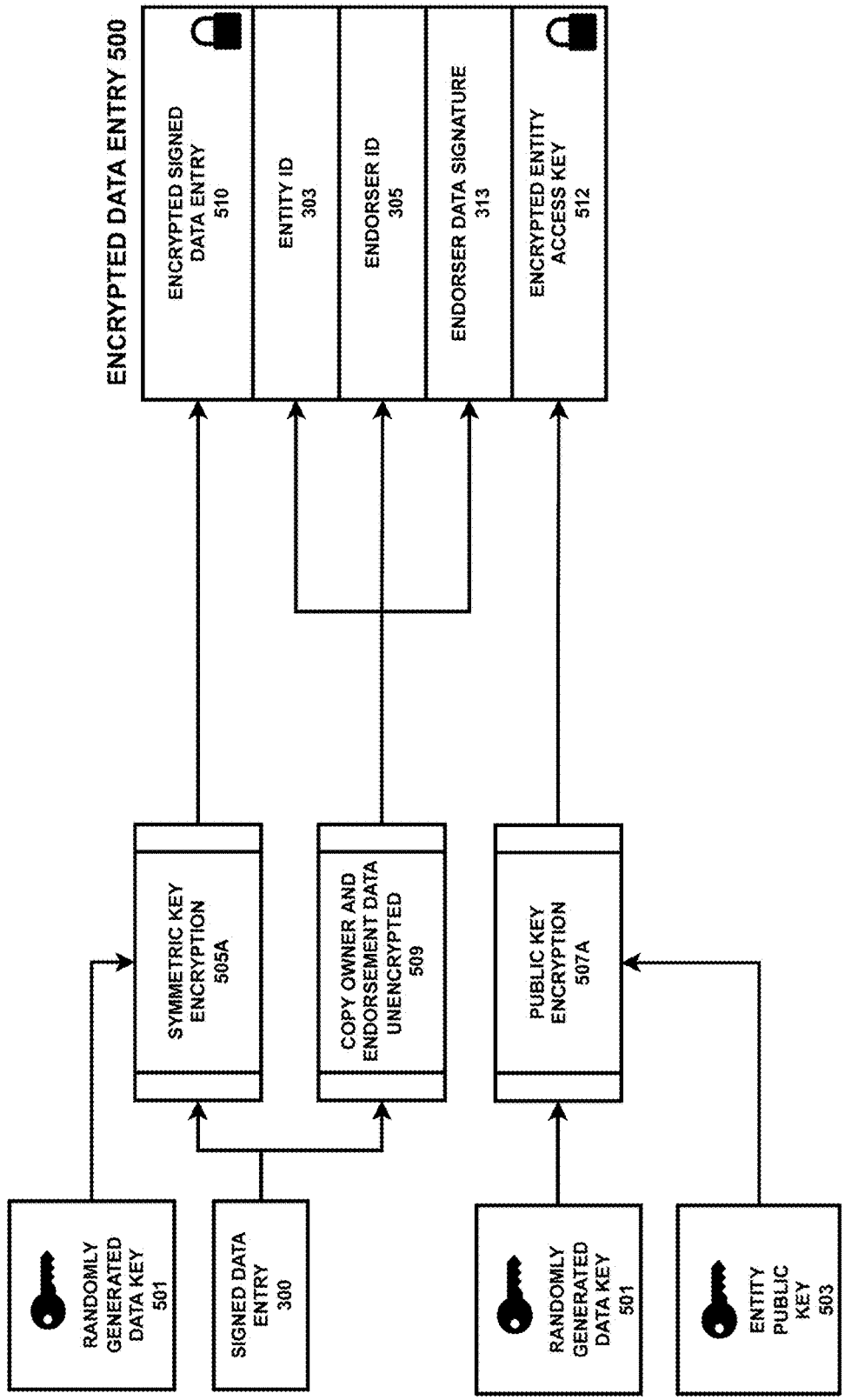
FIG. 5 is a flowchart of a method for generating encrypted data entry for a secure database according to some implementations of the disclosure.
Figure 6:
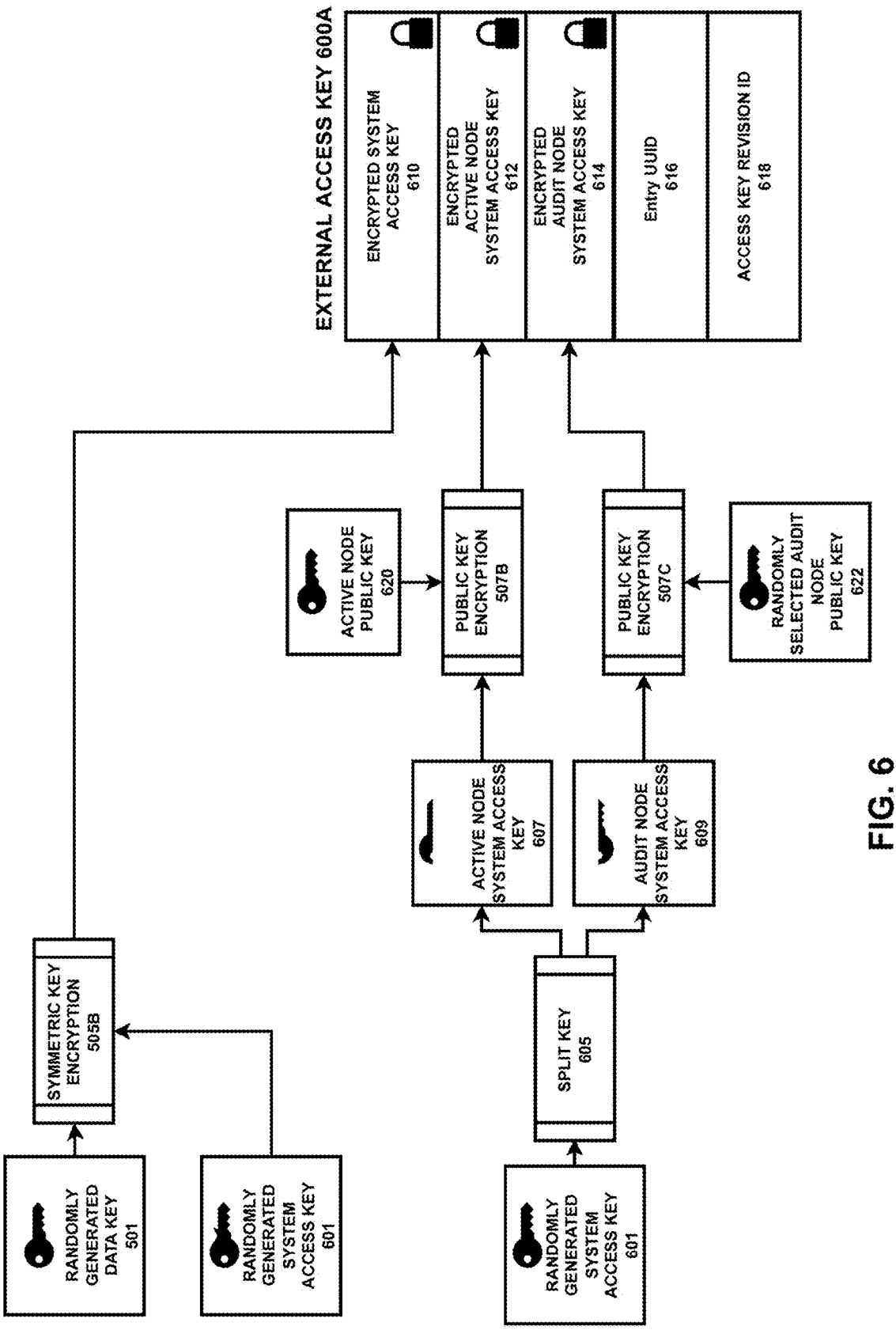
FIG. 6 is a flowchart of a method for generating an external access key for a secure database according to some implementations of the disclosure.
Figure 7:
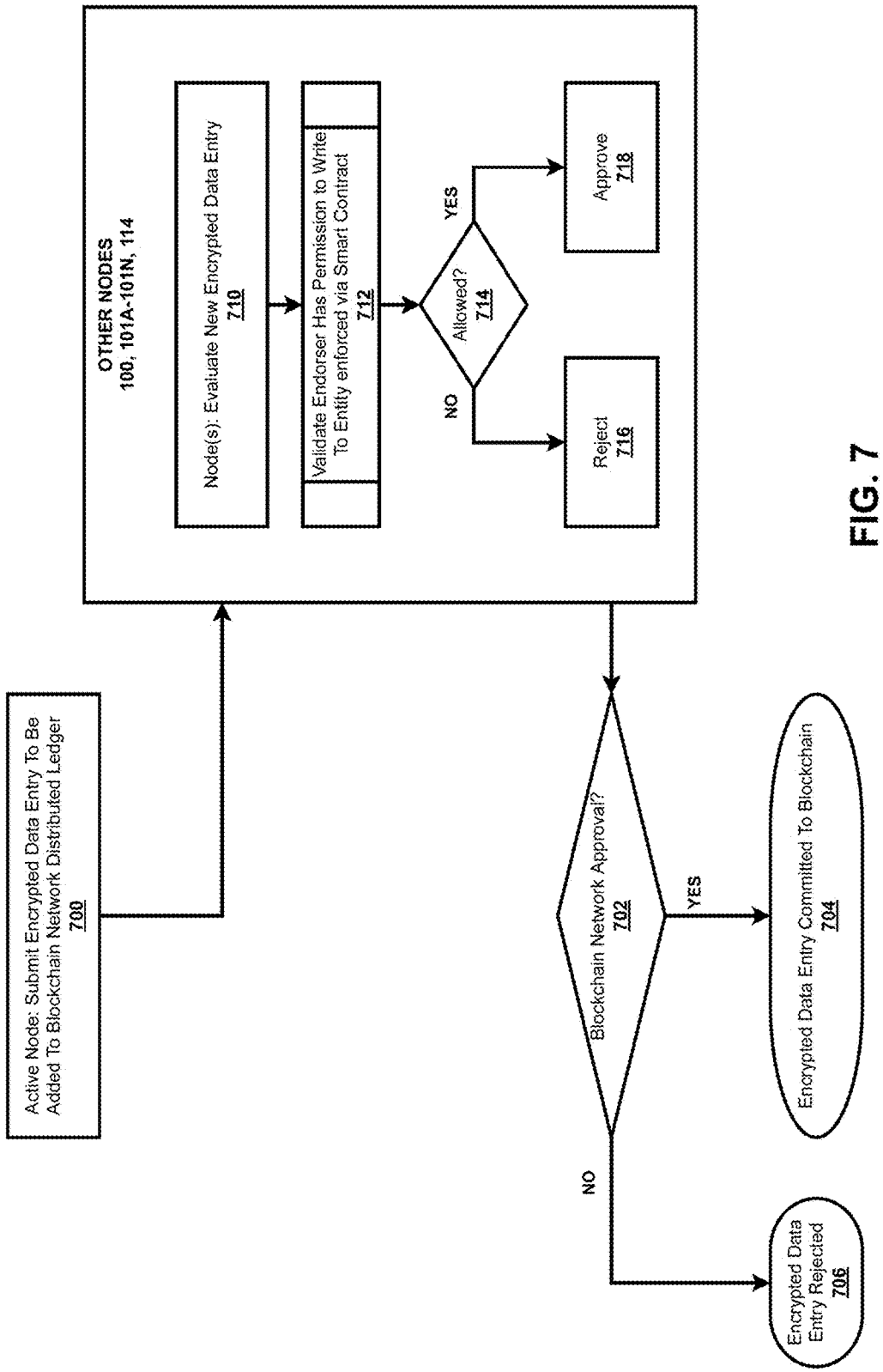
FIG. 7 is a flowchart of a method for submitting encrypted data to be added to a secure database according to some implementations of the disclosure.

FIG. 2 illustrates an example overview process of receiving a request to save private data to a secure database, processing the request, and writing the private data and associated encryption keys to the appropriate data stores (e.g., data store 104) in the secure database when the data has been validated. In some implementations, requests to save data to the secure database are received at web application server 109 and are transmitted to active node 100 for processing and storage on the secure database network 108. In some implementations, as illustrated at block 201, as the web application server 109 receives data to be stored on the secure database, the web application server 109 may generate a signed data entry associated with the data. FIG. 3 illustrates an example data structure and process of creating the signed data entry of block 201. In some implementations, as illustrated in block 203, the web application server 109 may transmit the signed data entry generated to the active node 100 (e.g., via an API service 102). In some implementations, as illustrated at block 205, the active node 100 may attempt to validate the signed data entry that was received from the web application server 109. FIG. 4 illustrates an example process of validating the signed data entry of block 205. In some implementations, as illustrated at block 207, the active node 100 may generate an encrypted data entry. FIG. 5 illustrates an example process of generating the encrypted data entry and the resulting data structure of the encrypted data entry. In some implementations, as illustrated at block 209, the active node 100 may generate an external access key. In some implementations, the external access key can be used to later access the data being saved to the secure database (e.g., by parties authorized by the owner of the data). In some implementations, the data owner (e.g., an entity) may use a different access key to access the data being saved to the secure database network 108. In some implementations, the data owner may use a different access key to access the private data and may utilize a different data access request methodology than described in FIG. 2 and may be able to decrypt the encrypted private data more directly. FIG. 6 illustrates an example process of generating an external access key and an example data structure of the external access key. It should be appreciated that the external access key may include more or fewer data elements. In some implementations, as illustrated at block 211, the active node 100 may submit the encrypted data entry generated in block 207 to be added to the secure database network 108. In some implementations, active node 100 uses blockchain communication with one or more other nodes in the blockchain (e.g., audit node 101A, etc.) to write the encrypted data entry to a blockchain ledger of the secure database network 108. FIG. 7 illustrates an example process of writing the encrypted data entry into the blockchain ledger of the secure database network 108. In some implementations, as illustrated at block 213, the active node 100 may save the external access key generated in block 209 to an external access key data store (e.g., data store 104). In some implementations, the external access key data store can be stored in active node 100. In some alternative implementations, the external access key data store is a database that can be stored in one or more of the audit nodes 101A-101N.

FIG. 3 illustrates one example of a process of block 201 in FIG. 2, which includes web application server 109 processing data to be saved in the secure database. In some implementations, the process includes generating a data structure for the signed data entry 300 that can be sent to an active node 100. In some implementations, the web application server 109 may receive an entry or data entry from a user that needs to be saved in the secure database. In some implementations, the data entry can come from a computer, such as computer 110. In some implementations, the data entry to be written to the secure database is the unencrypted data 301. In some implementations, the data entry may include data such as unencrypted data 301, entity ID 303, and an endorsement date 307. In some implementations, a data entry written to the secure database is associated with an entity through an entity id field, such as the entity ID 303. In some implementations, the endorsement date 307 is the date that the unencrypted data 301 is being written to the secure database and can be assigned by the web application server 109. In some implementations, the web application server 109 also obtains or generates, for public key encryption purposes, a public key/private key pair (e.g., endorser private key 311 and a public key that is not shown, but will be discussed in the context of validation in FIG. 4 and FIG. 7) for an endorser (e.g., an entity that is writing the unencrypted data 301 to the secure database). In some implementations, an endorser private key 311 and associated public key are generated once for the endorser and are reused one or more times (e.g., when the endorser creates one or more entries for the secure database). In some implementations, as shown in block 309A, the web application server 109 may use the endorser private key 311 to generate a digital signature using a private key data signing function creating a digital signature of one or more of the following data: unencrypted data 301, entity ID 303, and an endorsement date 307. It should be appreciated that other types of data can be digitally signed in various implementations. The generated digital signature can then become the endorser data signature 313. In some implementations, the web application server 109 may create the signed data entry 300 using one or more of the following pieces of data: unencrypted data 301, entity ID 303, endorsement date 307, endorser ID 305, and the endorser data signature 313. The endorser ID 305 can be a unique ID of the entity writing the unencrypted data 301 to the secure database. In some implementations, it should be appreciated that the endorser and the entity can be the same, creating a "self-endorsed" entry by the entity. However, in some implementations, the endorser and the entity may be separate/different entities. As noted in FIG. 2, the web application server 109 may transmit the signed data entry 300 to active node 100 for further processing. Using the medical records database example discussed above, a doctor may be the endorser that needs to store an entry in the secure database regarding the patient (the entity). For example, the doctor may have given the patient a vaccine and the doctor needs to securely record that the patient was given the vaccine (e.g., unencrypted data 301).

FIG. 4 illustrates an example process of block 205 in FIG. 2, which includes validating a signed data entry received at the active node 100. In some implementations, as illustrated at block 400, the active node 100 may process a received signed data entry (e.g., signed data entry 300). In some implementations, as illustrated at block 402, the active node 100 may attempt to validate data formatting of the signed data entry 300 against the subject schema selected based on an associated subject. In some implementations, the validation may include a program analyzing that the elements of signed data entry 300 have the correct data format (e.g., endorser ID 305 is in a number format). In some implementations, the validation may include a program confirming that particular data is in the signed data entry (e.g., an entity ID 303 is present). In some implementations, the validation may include a program confirming that particular data is the correct type of data (e.g., unencrypted data 301 includes a type of vaccine administered for a vaccine entry and flagging data that included an address rather than a type of vaccine). Other suitable data verification techniques can be used. In some implementations, if the signed data entry 300 does not pass the entry schema validation, the active node 100 may reject the signed data entry 300 as shown in block 416. In some implementations, as illustrated at block 404, when the active node 100 determines that the schema validation passed for the signed data entry 300, the process may move to block 406. In some implementations, as illustrated at block 406, the active node 100 may attempt to validate endorser signature (e.g., endorser data signature 313). In some implementations, the active node 100 may use public key signature verification to validate the endorser data signature 313 (e.g., using the endorser's public key associated with the private key 311 to validate the endorser data signature 313). In some implementations, if the active node 100 determines that the endorser signature is not valid, the active node 100 may reject the data entry as illustrated in block 416. In some implementations, if the active node 100 determines that the endorser signature is valid at block 408, the active node 100 may attempt to validate that the endorser (e.g., the entity requesting the data to be written to the secure database) has permission to write to the signed data entry 300 to the secure database as shown in block 410. The validation in block 410 may include a smart contract that looks up entries in the blockchain ledger to determine if one or more entries define a permission for the endorser to write new entries in the blockchain ledger that are associated with the entity ID. For example, in some implementations, code to evaluate a permission can be stored in the classification as a function. In some implementations, the function may specify an access control list or a role-based permission or other suitable schemes to determine whether an entity is allowed to write an entry for a give entity. In some implementations, if the active node 100 determines that the endorser does not have permission to write to the secure database as shown in block 412, then the active node 100 may reject the signed data entry 300 at block 416. In some implementations, if the active node 100 determines that the endorser does have permission to write the signed data entry 300 to the secure database, then as shown in block 414, the process moves to encrypt the data for storage on the secure database (e.g., block 207 in FIG. 2). Returning again to the medical records database example discussed above, a doctor (e.g., the endorser) may be associated with the patient (e.g., the entity) and the patient may have given the doctor permission to create entries in the secure database associated with the patient. The validation process in FIG. 4 may be used to confirm that the doctor created the vaccine entry (e.g., unencrypted data 301) and that the doctor has permission to create the vaccine entry for the patient in the secure database. If the entity writing the unencrypted data 301 is not the doctor or the doctor did not have permission, the active node 100 may prevent the vaccine entry from being added to the secure database.

FIG. 5 illustrates an example process of block 207 of FIG. 2, which includes the active node 100 generating an encrypted data entry 500 for storing such data in the secure database. In some implementations, the active node 100 may form an encrypted data entry 500 data structure from the signed data entry 300. In some implementations, the encrypted data entry 500 may be stored in the distributed blockchain ledgers 105A-105N. In some implementations, the encrypted data entry 500 may include an encrypted signed data entry 510. In some implementations, the active node 100 may form the encrypted signed data entry 510 with symmetric key encryption at block 505A. For example, as illustrated at block 505A, the active node 100 may encrypt the signed data entry 300 using a randomly generated data key 501 to generate an encrypted value resulting in the encrypted signed data entry 510 of the encrypted data entry 500. In some implementations, the active node 100 may copy other portions of the unencrypted signed data entry 300, such as the entity ID 303, the endorser ID 305, and the endorser data signature 313 from the signed data entry 300 to form other portions of the encrypted data entry 500 as shown in block 509. In some implementations, the entity ID 303 is unencrypted so that later lookups in the secure database can identify the encrypted data entry 500 as being associated with a particular entity. The endorser ID 305 and the endorser data signature 313 can be used in later processes, such as the process discussed in FIG. 7 to further validate the data entry embodied in the encrypted data entry 500 should be written to the distributed blockchain ledger of the secure database. In some implementations, the encrypted data entry 500 may include an encrypted entity access key 512, which is an encrypted version of the randomly generated data key 501 (which was used to symmetrically encrypt the signed data entry 300 in an encrypted format). Thus, in some implementations, the encrypted version of the randomly generated data key 501 is kept with the data to be unencrypted. In some implementations, the active node 100 may encrypt the randomly generated data key 501 using an entity's public key 503 as shown in the public key encryption block 507A to generate an encrypted value to form the encrypted entity access key 512. In some implementations, the entity is the entity associated with the entity ID 303. By encrypting the randomly generated data key 501 with the entity public key 503, an entity attempting to decrypt the encrypted signed data entry 510 can use an abbreviated access process discussed in connection with FIG. 9 rather than a more involved data access process discussed in connection with FIGS. 10-16b.

FIG. 6 illustrates an example process of block 209 in FIG. 2, which includes the active node 100 generating an external access key, such as external access key 600A. In some implementations, the external access key 600A is used by entities (e.g., users or machines), to access one or more data entries associated with an entity (where the users or machines are not the entity) stored in the secure database in the secure database network 108. In some implementations, the external access key 600A is used by such entities to access and decrypt one or more encrypted data entries 500 such as shown in FIG. 10-16b. In some implementations, the external access key 600A can be stored in data store 104. In some implementations, a data structure of the external access key 600A may include one or more different data components, such as an encrypted system access key 610, an encrypted active node system access key 612, an encrypted audit node system access key 614, an entry UUID 616, and an access key revision ID 618. In some implementations, external access keys 600A will be used as part of the process of unlocking one or more data entries stored in the secure database (e.g., in the distributed blockchain ledgers 105A-105N) on the secure database network 108 for an entity that does not "own" or "control" the data entries requested. In some implementations, the active node 100 may generate the encrypted system access key 610 using symmetric key encryption as shown in block 505B. For example, the active node 100 may create a randomly generated system access key 601 and encrypt the randomly generated data key 501 (e.g., the same cryptographic key used in FIG. 5 used to symmetrically encrypt the signed data entry 300 to be stored in the secure database) using symmetric key encryption. In some implementations, the active node 100 may also divide the randomly generated system access key 601 and further encrypt the divided keys as part of an access and audit control mechanism as is described below. In some implementations, the randomly generated system access key 601 can be split into two partial keys. The randomly generated system access key 601 can be split evenly or in another suitable manner. It should be appreciated that in some implementations, the randomly generated system access key 601 can be split into more than two portions (e.g., one or more portions to any suitable quantity of portions). One reason for splitting and further encrypting the randomly generated system access key 601 will become apparent in view of the process described below related to permitting an authorized entity (that does not control the signed data entry 300) to access the signed data entry 300. As shown in block 605, the active node 100 may split the randomly generated system access key 601. For example, the randomly generated system access key 601 can be divided into an active node system access key 607 and an audit node system access key 609. In some implementations, as illustrated at block 507B, the active node 100 may encrypt (using public key encryption) the active node system access key 607 with an active node public key 620 associated with the active node 100 to form the encrypted active node system access key 612. In some implementations, as illustrated at block 507C, the active node 100 may also encrypt (using public key encryption) the audit node system access key 609 with a randomly selected audit node public key 622 associated with one or more of the audit nodes (e.g., audit node 101A . . . 101N) to form the encrypted audit node system access key 614. In some implementations, by using an audit node's public key to encrypt the system access key 609, the audit node can be used to later decrypt the audit node system access key 614 using an associated audit node's private key. In some implementations, without the audit node decrypting the encrypted audit node system access key 609 using the associated audit node's private key, the secure database may not be able to decrypt the encrypted system access key 610 to ultimately decrypt the encrypted signed data entry 510. As will become more apparent in the discussion below, using an audit node to decrypt the audit node system access key 614 further distributes the access process among more than one node in the secure database network 108, which can make it more difficult for a bad actor that has compromised one or more nodes in the secure database network 108 to gain access to the encrypted data stored in the secure database. In some implementations, distributing the access also prevents accidental or abuse of private data by an operating organization of the secure database. In some implementations, where the randomly generated system access key 601 is split into more than two portions, more than one audit node can be used to encrypt the portions of the split key (e.g., block 507C can be used with more than one audit node)—which can further distribute the portions of randomly generated system access key 601 across nodes of the secure database network 108. In some implementations, because the secure database may store many external access keys 600A, the entry UUID 616 can be used to uniquely identify a particular external access key 600A and associate it with the appropriate encrypted data entry 500. In some implementations, the external access key 600A may include an access key revision ID 618. As will be discussed below in greater detail, when an entity uses an external access key 600A, the one or more encryption keys (e.g., randomly generated system access key 601, encrypted system access key 610, encrypted active node system access key 612, encrypted audit node system access key 614) used to form the external access key 600A may be discarded after use and replaced with new encryption keys to keep the accessed encrypted data entries 500 from being re-accessed without permission. It should be appreciated that in various implementations, the external access key 600A may include more or fewer data components.

Figure 14:
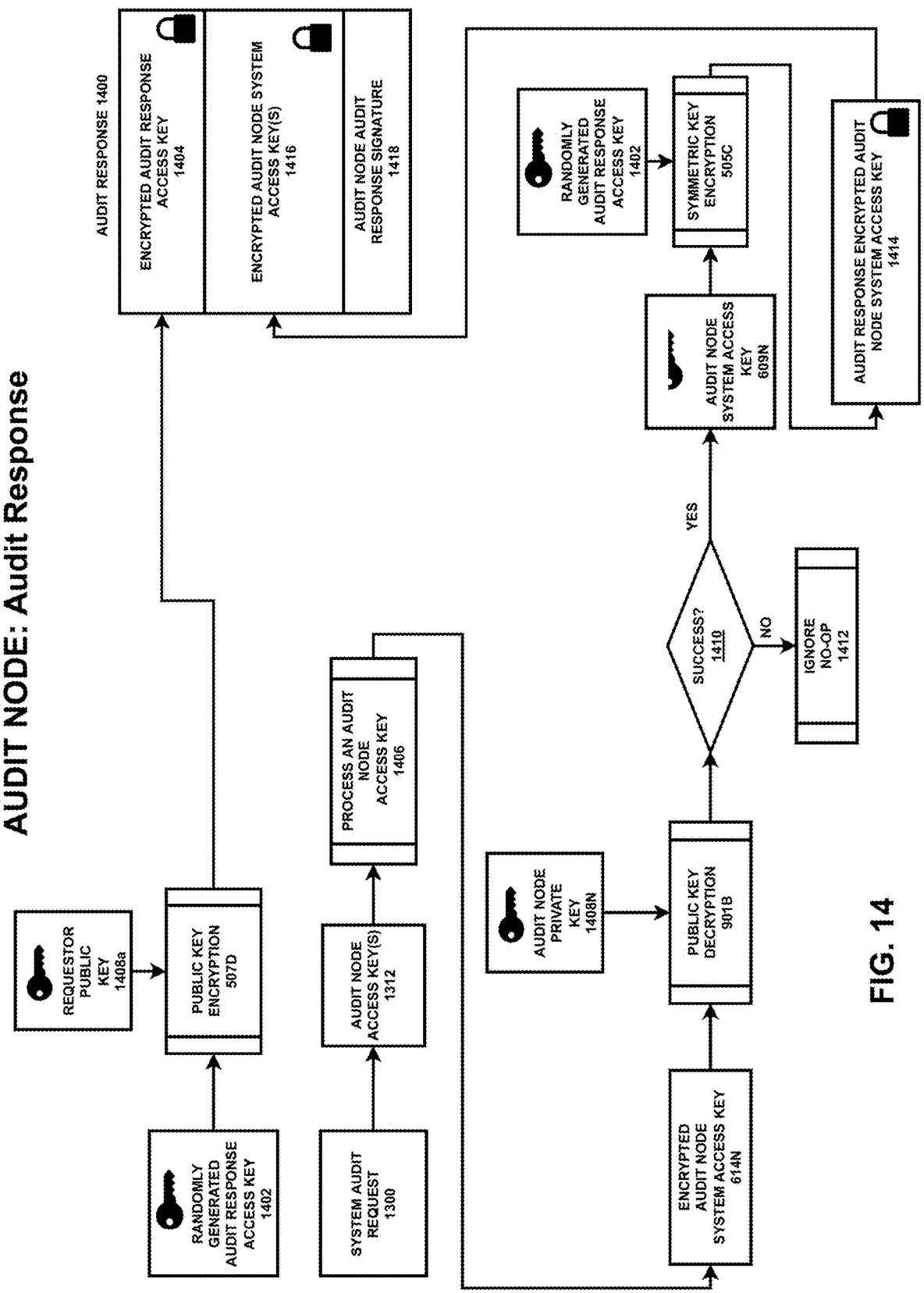
FIG. 14 is a flowchart of a method for auditing a response in a secure database according to some implementations of the disclosure.

In some implementations, an audit node is associated with a unique public/private key pair, which can be used for the public key encryption process in block 507C and the public key decryption process in 901B in FIG. 14. Under this structure, different encrypted entries (e.g., encrypted data entries 500) may require different audit nodes to decrypt portions of the randomly generated system access key 601. In some implementations, one or more audit nodes may share a public/private key pair, which can be used for the public key encryption process in block 507C and the public key decryption process in 901B in FIG. 14. When more than one audit node shares a public/private key pair, the secure database includes additional redundancy if an audit node becomes unavailable (e.g., additional audit node will have the private key pair that will enable the public key decryption process in 901B in FIG. 14).

FIG. 7 illustrates an example process of block 211 in FIG. 2, that may include the process of submitting the encrypted data entry 500 to be recorded in the secure database in the secure database network 108 (e.g., in the distributed blockchain ledgers 105A-105N). In some implementations, as shown in block 700, the active node 100 may submit the encrypted data entry 500 to be added to the distributed blockchain ledger (e.g., distributed blockchain ledger 105A . . . distributed blockchain ledger 105N) of the secure database. As shown in FIG. 1, the distributed blockchain ledger can be contained in the various nodes (e.g., active node 100, audit node 101A, audit nodes 101A . . . audit node 101N, and blockchain nodes 114). In some implementations, the active node 100 may communicate via a broadcast message with the various nodes using a blockchain gossip protocol to distribute the encrypted data entry 500 to the other nodes for adding to their respective distributed blockchain ledgers. In some implementations, the various nodes may communicate the encrypted data entry 500 to be written to their respective distributed blockchain ledgers using blockchain gossip protocol communication between the various nodes. In some implementations, as shown in block 710, various nodes may evaluate the encrypted data entry 500 to determine whether the encrypted data entry 500 should be written to the distributed blockchain ledgers in the various nodes. In some implementations, as shown in block 712, one or more of the various nodes may execute a smart contract (e.g., a DApp) to determine whether the endorser (e.g., the user or entity associated with the endorser ID 305) requesting to write the encrypted data entry 500 to the secure database, has permission to store the data in the secure database. In some implementations, block 712 may be similar to block 410 in FIG. 4. As shown in block 714, if one or more of the various nodes determine (e.g., using a predefined consensus process—which may be stored as DApps) that the endorser does not have permission to store the data (e.g., the encrypted data entry 500) in the secure database, then the encrypted data entry 500 may be rejected at block 716. Further, if one or more of the various nodes determine to reject the endorser, then the encrypted data entry 500 is rejected as shown in blocks 702 and 706. In some implementations, as shown in block 714, if the various nodes determine (e.g., using a predefined consensus process) that the endorser does have permission to store the data (e.g., the encrypted data entry 500) in the secure database, then the encrypted data entry 500 is approved at block 718. Further, if the various nodes determine to approve the endorser as shown in block 702, then the various nodes will commit the encrypted data entry 500 to the secure database as shown in block 704. That is, in some implementations, one or more of the various nodes of the secure database network 108 may write the encrypted data entry 500 to their respective distributed blockchain ledgers.

It should be appreciated that one or more data blocks (e.g., data entries like the signed data entry 300) that are to be stored in the secure database on the secure database network 108 can be stored in the manner set forth above. It should be appreciated that one or more different data blocks can be stored in the secure database on the secure database network 108 in other suitable ways.

FIGS. 8-16b illustrate some example processes used to access data entries stored in the secure database (e.g., encrypted data entry 500 stored in the distributed blockchain ledger) on the secure database network 108. In some implementations, the processes may vary for different types of users or entities. For example, as will be described in more detail, in some implementations, the secure database may use a multilevel verification and data decryption process that can be distributed between one or more nodes (e.g., active node 100 and an audit node 101A) before providing data entries to a requesting user or entity. In some implementations, the secure database may use a simpler verification and data decryption process for some requesting users/entities. That is, in some implementations, the process that enables access to a stored entry in the secure database may be different for a user that owns or controls the stored entry (e.g., where the requesting user or entity is the entry owning entity that is requesting records associated with the entity) versus a user that does not control the stored data entry (e.g., the requesting user or entity is an entity that is requesting records associated with a different entity).

Figure 8:
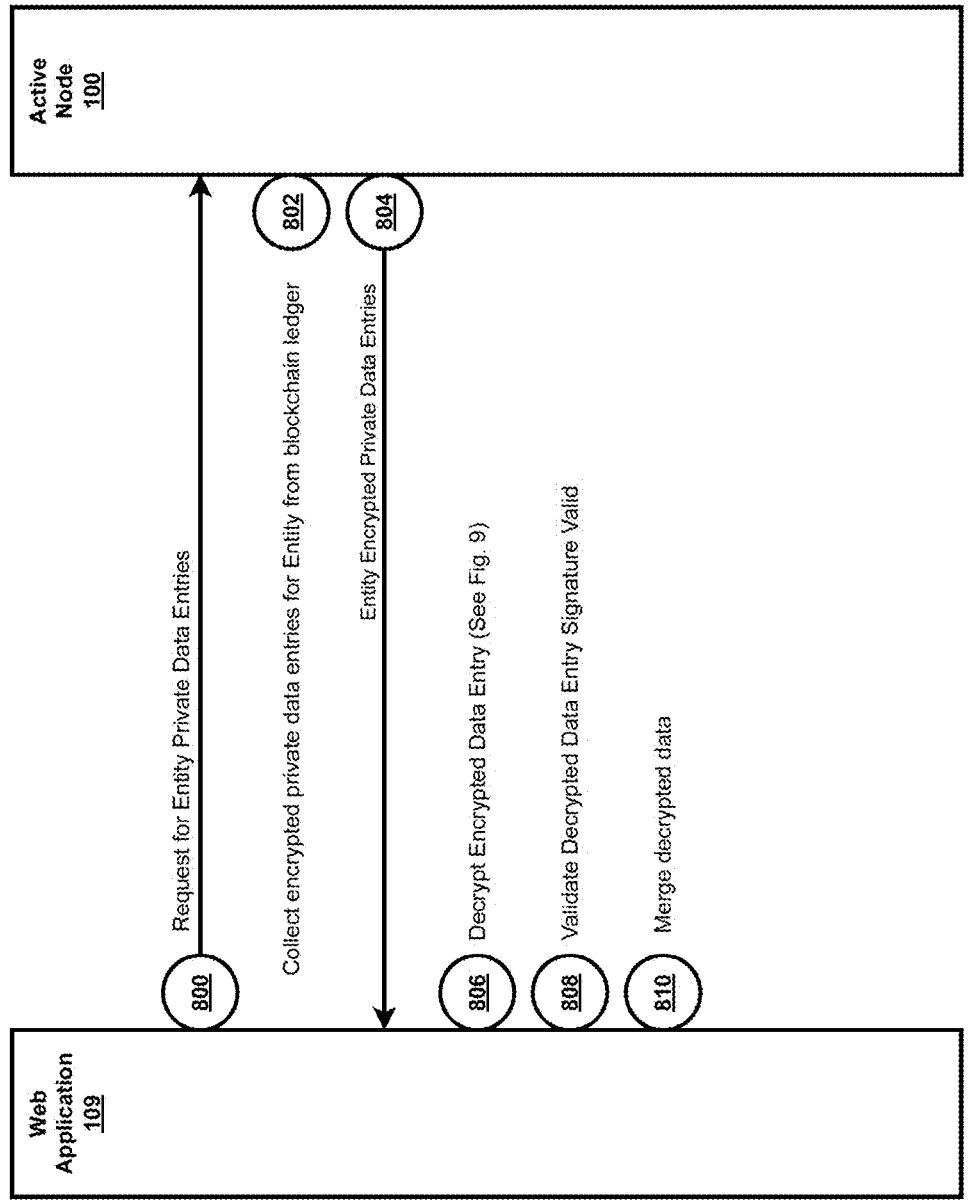
FIG. 8 is a block diagram of different systems and a high level message flow between the different systems for reading private data according to some implementations of the disclosure.

FIG. 8 illustrates an example overview process of enabling an entity private data read of one or more data entries (e.g., encrypted data entry 500 stored in the distributed blockchain ledger) stored in the secure database on the secure database network 108. In some implementations, FIG. 8 illustrates an entity (e.g., a user, entity, or object) that requests retrieval or read access to data entries in the secure database, where the requested data entries are associated with the entity or an owning entity (e.g., the encrypted data entry 500 with the same entity ID 303 as the entity making the request). In some implementations, an entity is presumed to have read access to data entries in the secure database that are associated with the entity. In some implementations, an entity may have read and/or write access to data entries in the secure database that are associated with the entity. For example, in some implementations, the entity may have access to the entity's private key, which can be used to decrypt the encrypted entity access key 512 to provide the randomly generated data key 501 to decrypt the encrypted signed data entry 510. Whereas other entities (e.g., entities with different entity IDs 303 from the data entries being requested), in some implementations, will not have access to the owning entity's private key and will not be able to decrypt the encrypted entity access key 512 (e.g., these other entities may need to use the process described in FIG. 10-FIG. 16b to gain access to the encrypted signed data entry 510).

It should be appreciated that in some implementations as used herein, an owing entity with respect to data or entries in the secure database may not mean that the entity owns the data in the traditional sense (e.g., in same manner as one would own property and have property rights). In some implementations, an owning entity connotes a type of data association or data relationship between an entity and an entry in the secure database. In some implementations, an entry in the secure database may "belong" to an entity. For example, in some implementations, an entry in the secure database can be immutably associated with an entity. In some implementations, an entry in the secure database does not change owning entities.

One example of the "owning entity" construct between an owning entity and an entry can be found in a secure database that stores information about cars. In some implementations, a car can be an entity in a secure database. In some implementations, one or more entries in the secure database belong to the car entity. For example, an entry in the secure database that "belongs" to the car may include an entry for a unique vehicle identification number (i.e., a VIN). In some implementations, an entry for the unique VIN "belongs" to the car entity and cannot get reassigned to another car entity (e.g., typically a VIN is unique to one car and cannot legally be reassigned to another car). Thus, in some implementations, the car entity in the secure database can be an "owning" entity for the VIN entry, where there is not a traditional property ownership right between the car and the VIN. As a contrast to the car being an "owning" entity with respect to a VIN entry, the secure database may reflect property ownership in a different way. The secure database may include an entity such as a car owner. The car owner entity may legally "own" the car (e.g., have legal property rights in the car). In some implementations, the secure database can reflect this traditional property ownership relationship between the car owner entity and the car entity by storing an entry in the secure database that reflects that the car owner entity owns (e.g., in the legal property sense) the car entity. Since the car owner entity may sell the car at some point, in some implementations, it may not be appropriate to make the car owner entity an "owning entity" of the car entity or the VIN entry for the car entity. In some implementations, the entry that reflects the ownership relationship between the car entity and car owner entity may be "owned" by the car owner entity. That is, the car owner entity can be the "owning entity" with respect to the entry that states that the car owner entity has legal ownership of the car entity.

In some implementations, owning data in the secure database may include having some level of control over the data or entries (e.g., control over who may access the data), but may not include all rights that may correspond to owning property or digital property. An example of an owning entity that does not necessarily have full ownership rights over data in the secure database is a patient in a medical records database. The patient may have control over what other entities may access or write entries associated with the patient (e.g., to enter what vaccines a patient received), but the patient may not physically own or fully control the patient's entries in the medical records database (e.g., based on the secure database). For example, the patient may not be permitted to add an entry into the medical records database that the patient received a particular vaccine. This sort of data entry may be reserved for an endorser like a doctor or a nurse. In some implementations, the patient may not be able to remove or delete entries in the medical records database, thus the patient (an owning entity with respect to the patient's data) may not "own" entries in the traditional sense in the secure database. It should also be appreciated that in some implementations, an entity may "own" entries in the secure database in a traditional sense.

Returning again to the medical records database example discussed above, consider the example of the patient (e.g., the entity) requesting their personal vaccine records (entries associated with the entity) from the secure database versus another entity (that may or may not be authorized to access the patient's vaccine records). The example process illustrated in FIG. 8 enables the patient faster, but secure access, to the patient's own entries stored in the secure database, but in some implementations, forces other entities to use a more auditable and/or secure process to view the same requested data entries related to the patient's vaccine records.

Returning to the top of FIG. 8, in some implementations, the web application server 109 may receive a request from a user (e.g., an entity) for one or more entries associated with the entity (e.g., the encrypted data entry 500 and/or other data entries in the secure database associated with the same entity). In some implementations, as shown in block 800, the web application server 109 may transmit a request for one or more data entries associated with the entity to the active node 100. In some implementations, active node 100 may collect one or more encrypted private data entries associated with the entity (e.g., encrypted data entries 500 with an entity ID 303) from the distributed blockchain ledger 105A on the active node 100 as shown in block 802. In some implementations, as shown in block 804, the active node 100 may transmit one or more of the collected encrypted private data entries for the entity to the web application server 109. In some implementations, because the one or more of the collected encrypted private data entries are encrypted, the web application server 109 may decrypt one or more of the collected encrypted private data entries as shown in block 806. An example of a process to decrypt the one or more of the collected encrypted private data entries is discussed in greater detail in the process illustrated in FIG. 9. As described in FIG. 9, the decryption may not occur if the requesting entity does not have the owning entity's private key 903 (e.g., which is part of the key pair associated with the entity public key 503). In some implementations, as shown in block 808, the web application server 109 may validate the decrypted data entry signature. For example, the web application server 109 may retrieve the public key for the endorser (based on the endorser ID 305) and run a public key signature verification routine on the endorser data signature 313 using the public key for the endorser. If the verification routine fails, the web application server 109 may alert the user that the data could be compromised. In some implementations, as shown in block 810, the web application server 109 may merge the decrypted data (e.g., where the data retrieval in block 802 include multiple entries from the secure database, the entries may be combined as is necessary to provide the data to the requesting user). In some implementations, access to the entity private data read process of FIG. 8 can further be protected using a challenge authentication with the requester to confirm identity of the entity prior to block 800.

Figure 9:
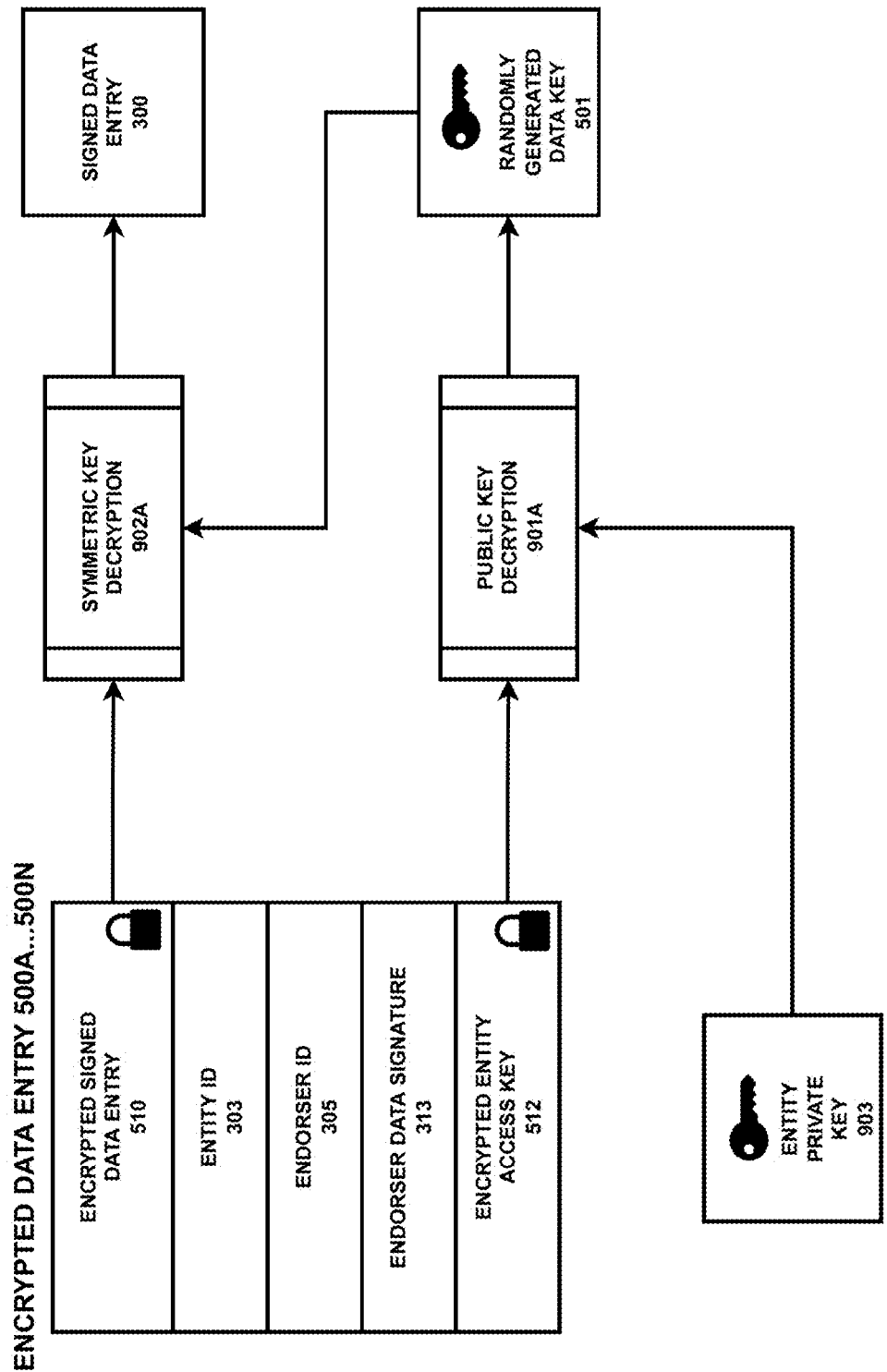
FIG. 9 is a flowchart of a method of decrypting encrypted data in a secure database according to some implementations of the disclosure.

FIG. 9 illustrates an example process shown in block 806 in FIG. 8, including decrypting one or more encrypted private data entries (e.g., the encrypted data entry 500) retrieved from the active node 100 to reveal the signed data entry 300 with the unencrypted data originally sent for secure storage in the secure database in FIG. 2. In some implementations, the encrypted data entry 500 includes the same or similar data structure outlined in FIG. 5. To release the unencrypted data 301, in some implementations, the web application server 109 obtains the randomly generated data key 501 that is locked in the encrypted entity access key 512. In some implementations, the web application server 109 may obtain the entity private key 903 (which could be provided by the entity or retrieved from a data store on the web application server 109 or other suitable server). When the web application server 109 has obtained the entity private key 903, the web application server 109 may decrypt the encrypted entity access key 512 using the entity's private key 903 performing a public key decryption as shown in block 901A. In some implementations, the decryption process in block 901A releases the randomly generated data key 501. In some implementations, the web application server 109 may use the randomly generated data key 501 to perform symmetric key decryption on the encrypted signed data entry 510, as shown in block 902A. In some implementations, the decryption process in block 902A may release the signed data entry 300, which includes the unencrypted data 301. In some implementations, the web application server 109 may display the unencrypted data 301 or transmit the unencrypted data 301 to the requesting entity. It should be appreciated that in some implementations, the decryption process discussed in FIG. 9 can be carried out on other suitable devices, such as computer 110 or active node 100.

Figure 10:
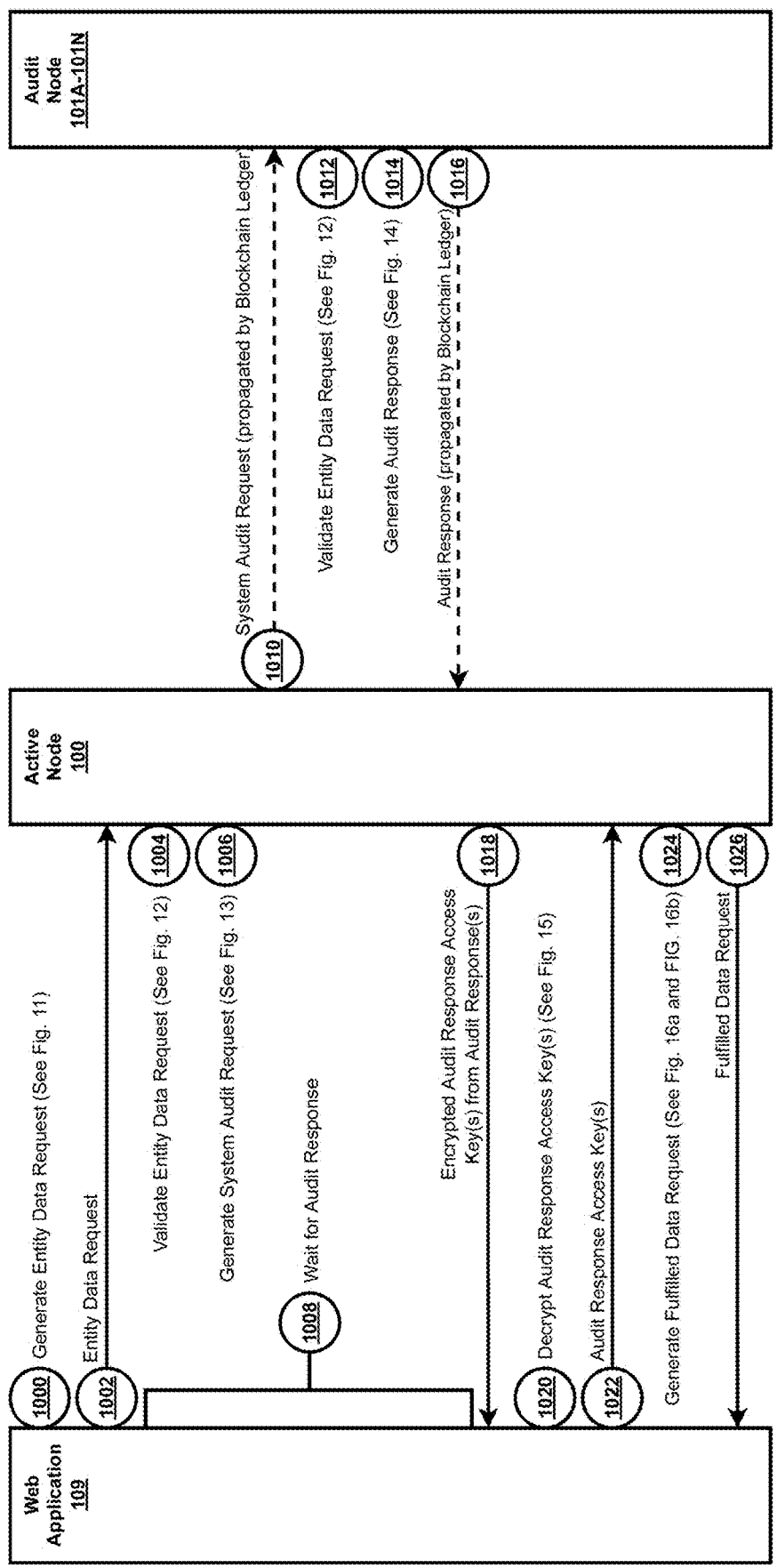
FIG. 10 is a block diagram of different system and a high level message flow between the different systems for reading data in a secure database according to some implementations of the disclosure.

FIG. 10 illustrates an example overview process of enabling an external entity private data read of one or more entries (e.g., the encrypted data entry 500) stored in the secure database on the secure database network 108. FIG. 11, FIG. 12, FIG. 13, FIG. 14, FIG. 15, FIG. 16a, and FIG. 16b describe further details of the overview process in FIG. 10 of enabling the external entity private data read of the one or more entries (e.g., the encrypted data entry 500). In some implementations, the external entity is an entity that does not own or control the encrypted data entry 500. As discussed above, an external entity may be an entity with an entity ID that is different from the entity ID associated with the entries being requested from the secure database on the secure database network 108. In some implementations, an external entity can be an endorser that created signed data entry 300 discussed in FIG. 3. In some implementations, the web application server 109 may receive a request from an external entity for one or more entity private data entries (e.g., the encrypted data entry 500 and/or other entries associated with an entity ID that differs from an entity ID associated with the external entity). For purposes of explanation, the entity making a request for data is a medical insurance company and the medical insurance company is requesting medical records associated with the patient that were earlier entered by the patient's doctor.

Figure 11:
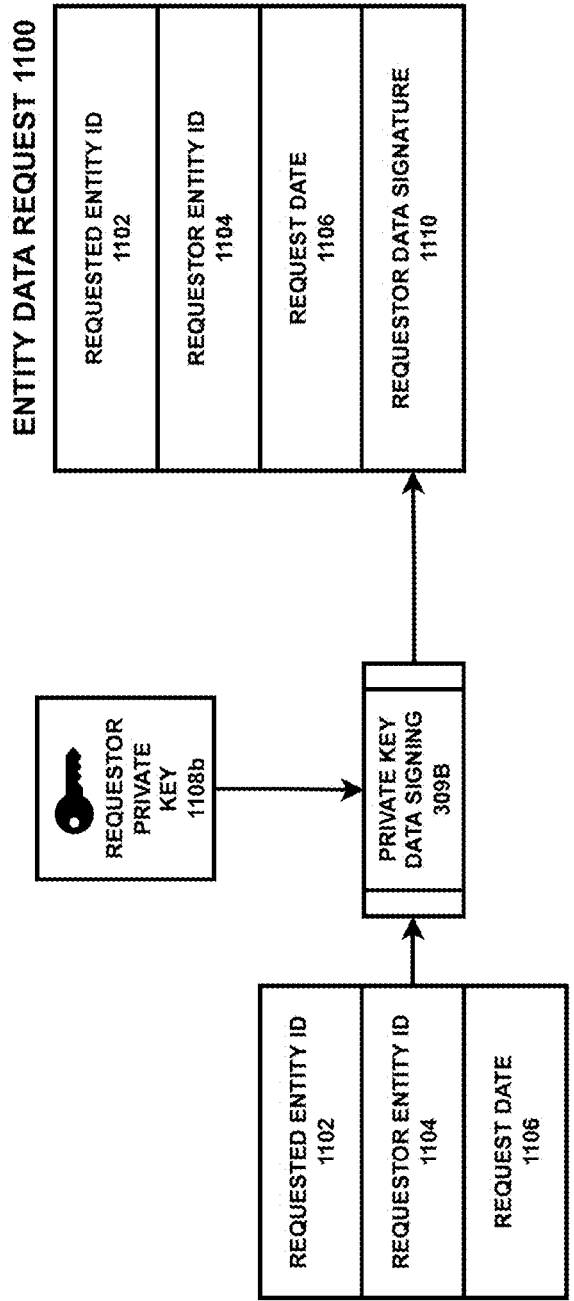
FIG. 11 is a flowchart of a method for requesting data according to some implementations of the disclosure.
Figure 12:
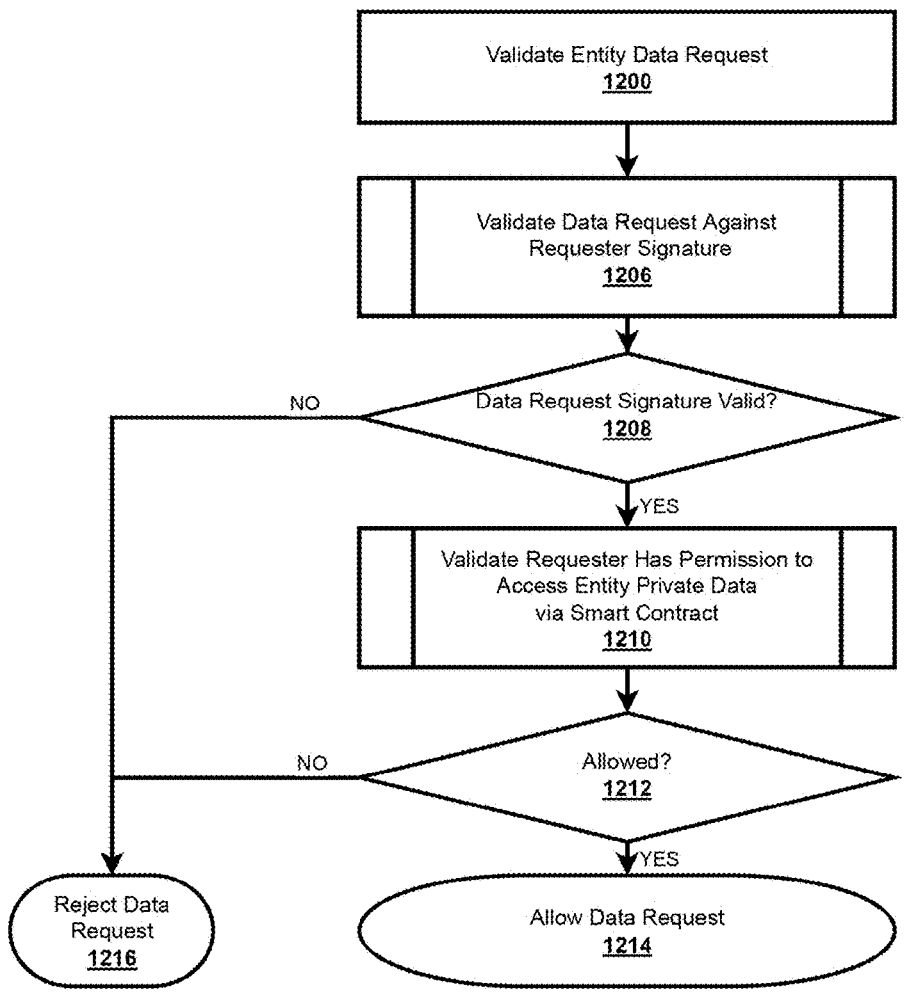
FIG. 12 is a flowchart of a method for validating a request for data in a secure database according to some implementations of the disclosure.
Figure 13:
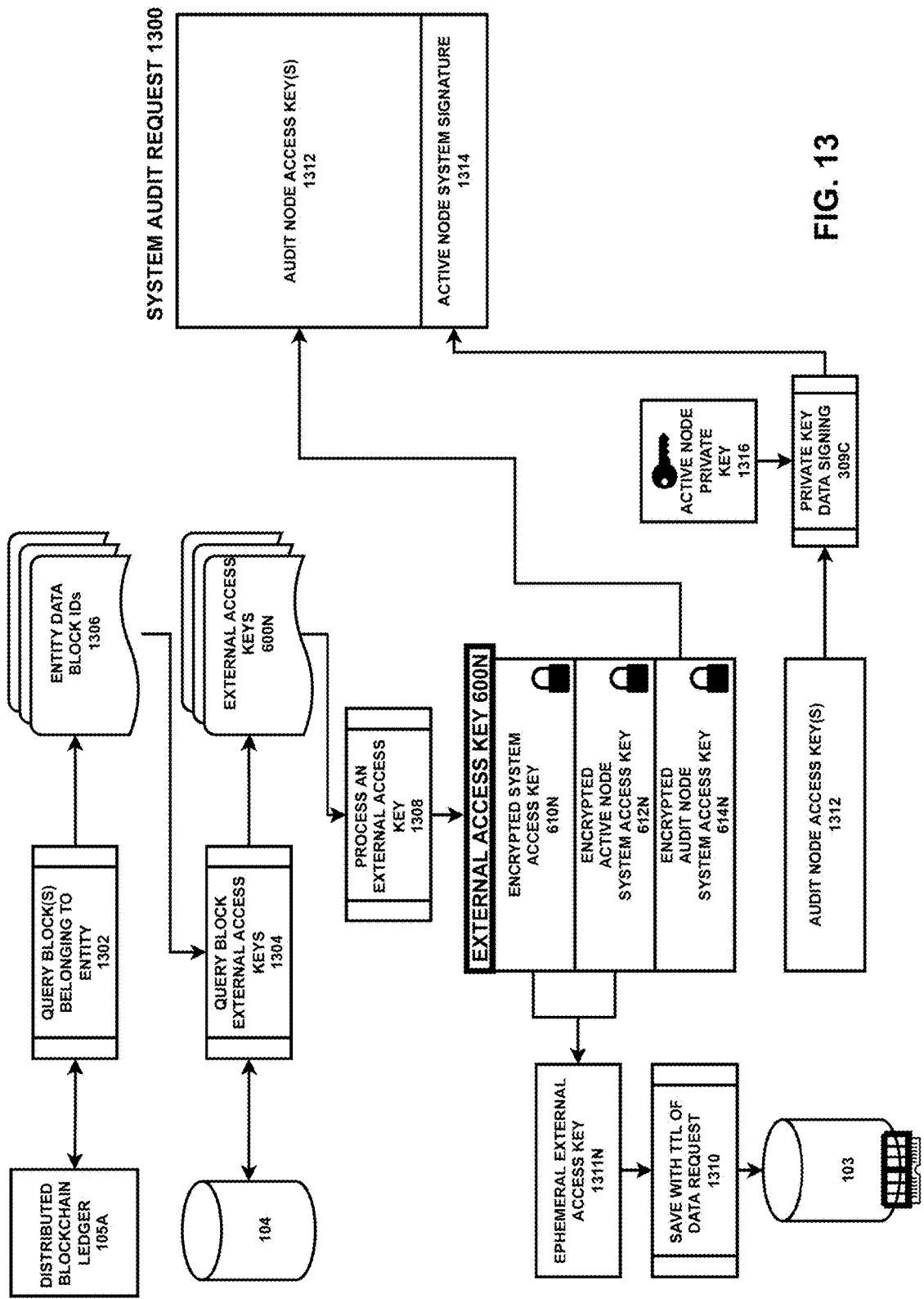
FIG. 13 is a flowchart of a method for auditing a request in a secure database according to some implementations of the disclosure.

In some implementations, as shown in block 1000, the web application server 109 may generate an entity data request based on receipt of a request for one or more entity private data entries from an entity (e.g., an external entity). For example, the request may be for an entity ID 303 of encrypted data entry 500 created in FIG. 5 and the entity making the request does not own or control the entity ID 303 (e.g., an insurance company can be an entity that the patient gives permission to access the patient's medical records entries, but the insurance company does not own or control the patient's medical records entries). In some implementations, an entity information can be associated with a machine or a person. An example process of generating an entity data request is shown in FIG. 11. In some implementations, as shown in block 1002, the web application server 109 may transmit the entity data request to the active node 100. In some implementations, as shown in block 1004, the active node 100 may attempt to validate the entity data request. FIG. 12 illustrates an example process of validating an entity data request. In some implementations, as shown in block 1006, the active node 100 may generate a system audit request. FIG. 13 illustrates an example process of generating a system audit request. In some implementations, the web application server 109 may wait for an audit response as shown in block 1008. In some implementations, block 1008 may involve polling for responses from audit nodes (asynchronous calls vs a synchronous blocking call waiting for response in 1 HTTP Call).

In some implementations, as shown in block 1010, the active node 100 communicates the system audit request to the one or more other nodes in the secure database network 108. In some implementations, active node 100 communicates the system audit request by propagating the system audit request via the distributed blockchain ledger (e.g., via blockchain distribution protocols). For example, the active node 100 may write the system audit request to the distributed blockchain ledger 105A and then broadcast the update to the distributed blockchain ledger to the other nodes of the secure database network 108, as discussed above. By using blockchain communication and the distributed blockchain ledger to communicate the system audit requests, the requests to access the entity private data entries are logged onto the blockchain ledger to create an audit trail of an external entity accessing the entity private data entries under the data request of block 1000.

In some implementations, as illustrated in block 1012, one or more of the audit nodes (e.g., audit node 101A-audit node 101N) may validate or attempt to validate the entity data request. FIG. 12 illustrates an example process of validating the entity data request of block 1012. In some implementations, as shown in block 1014, the one or more audit nodes (e.g., audit node 101A-audit node 101N) may generate an audit response. An example process of generating an audit response is illustrated in FIG. 14. In some implementations, as shown in block 1016, the one or more audit nodes (e.g., audit node 101A-audit node 101N) that participate in the validation of the entity data request and generate an audit response may send their respective audit responses to active node 100 and/or to the other audit nodes. In some implementations, the audit responses can be communicated to the one or more other nodes (e.g., active node 100 and/or audit node 101A-audit node 101N) in the secure database network 108 via blockchain communication (e.g., the audit responses can be propagated by the blockchain ledgers). By using blockchain communication and the distributed blockchain ledger to communicate the audit responses, the responses to requests to access the entity private data entries are logged onto the blockchain ledger to create an audit trail of the external entity accessing the entity private data entries under the data request of block 1000. It should be appreciated that in some implementations, one or more audit nodes may not be able to complete blocks 1010, 1012, 1014, and 1016. For example, in some implementations, when the encrypted audit node system access key 614 was generated, the active node 100 randomly selected a public key associated with one of the available audit nodes that are part of the secure database system. As will be shown in FIG. 14, in some implementations, the audit node with the corresponding private key is used to decrypt the encrypted audit node system access key 614. In some implementations, audit nodes without the corresponding private key are not able to decrypt the encrypted audit node system access key 614 because the other audit nodes may have different private keys. In some implementations, the audit responses may include encrypted access keys. For example, in some implementations, as shown in block 1018, the active node 100 may transmit encrypted audit response access key(s) from audit response(s) of the one or more audit nodes. In some implementations, as shown in block 1020, the web application server 109 may decrypt audit response access key(s). An example process of block 1020 can be found in the description of FIG. 15 below. In some implementations, if the entity requesting access to the data has permission, as shown in block 1022, the web application server 109 may transmit decrypted audit response access key(s) to the active node 100. In some implementations, as shown in block 1024, the active node 100 may use the decrypted audit response access keys to enable decryption of the entries associated with the entity of the data request from block 1000 and generate a fulfilled data request. An example process of generating the fulfilled data request is described in FIG. 16a and FIG. 16b. In some implementations, as shown in block 1026, the active node 100 may transmit the fulfilled data request to the web application server 109. In some implementations, between block 1024 and block 1026, the active node 100 may rerun the process of FIG. 6 to regenerate external access keys. These regenerated external access keys 600A will be used to later decrypt the randomly generated data keys 501 that secure entries in the secure database. In some implementations, the previously used external access keys 600A can be deleted or destroyed such that old requests for entity private data entries expire.

FIG. 11 illustrates an example process of generating an entity data request for an external entity as shown in block 1000 of FIG. 10. For example, the entity data request can be a request for entries associated with entity ID 303 of the patient from the previously introduced example. An insurance company may request to review the patient's medical record entries made by the patient's doctor. In some implementations, the entity data request can be generated at the web application server 109. It should be appreciated that the entity data request can be generated at other suitable devices. In some implementations, the entity data request 1100 is formed from one or more data elements. In some implementations, the entity data request 1100 may include a requested entity ID 1102, a requestor entity ID 1104, a request date 1106, and a requestor data signature 1110. In some implementations, the requested entity ID 1102 identifies the entity that is being requested. For example, if the same patient from the example given in FIG. 3 is the entity of the data request in block 1000, the entity ID 303 in FIG. 3 can be the same entity ID as the requested entity ID 1102. The entity information that is eventually obtained from the secure database may include one or more entries stored in the secure database to form the entity record. In some implementations, the requestor entity ID 1104 identifies the entity making the request for the entity private record. In the medical records example, the requestor entity ID 1104 may be the entity ID associated with the medical insurance company. In some implementations, request date 1106 is the date that the entity makes the request for the entity private data entries identified using the requested entity ID 1102. In some implementations, as shown in block 309B, the web application server 109 may generate a digital signature of the requested entity ID 1102, the requestor entity ID 1104, and the request date 1106 using the requestor's private key 1108b to result in the requestor data signature 1110.

FIG. 12 illustrates an example process of validating an entity data request as discussed in connection with block 1004 in FIG. 10. In some implementations, the process of validating an entity data request starts at block 1200 at the active node 100. In some implementations, the active node 100 may validate data request against requester signature as shown in block 1206. In some implementations, the active node 100 may obtain the public key of the requestor and apply public key signature validation to the requestor data signature 1110 to determine if the requestor data signature 1110 is valid. If the requestor's data signature is determined to be invalid at block 1208, then the active node 100 may reject the entity data request as shown in block 1216. If the requestor's data signature is determined to be valid at block 1208, then the active node 100 may move to block 1210. In some implementations, as illustrated in block 1210, the active node 100 may perform an additional procedure based on the received entity data request 1100. For example, in some implementations, the active node 100 may validate that the requester has permission to access entity private data using one or more DApp smart contracts. For example, in some implementations, the validation in block 1210 may include a DApp smart contract that looks up entries in the blockchain ledger to determine if one or more entries define a permission for the requestor to access private data associated with an entity. In some implementations, the active node 100 may determine if the requestor is an entity in the secure database and determine if the requestor is associated with a classification that defines a permission to access the entity private data entries defined by the requested entity ID 1102 in FIG. 11. In some implementations, if the active node 100 determines that the requestor does have permission to access the entity private data in the secure database, then as shown in block 1212, the process moves to allow the data request in block 1214. Where the data request is allowed in block 1214, the active node 100 may move to block 1006 of FIG. 10. It should be appreciated that the same or a similar process described in connection with FIG. 12 can be used by one or more of the audit nodes (e.g., audit nodes 101A-audit nodes 101N), as shown in block 1012 of FIG. 10.

FIG. 13 illustrates an example process of active node 100 generating a system audit request as discussed in connection with block 1006 in FIG. 10. In some implementations, this example process occurs when the outcome of the validation entity data request of block 1004 determines that the requestor has permission to access the data (from block 1000 of FIG. 10). For example, the active node 100 determines that the medical insurance company has permission to access the patient's records. In some implementations, the process of FIG. 13, may start at block 1302, where active node 100 queries distributed blockchain ledger 105A for entity private data entries associated with an entity (e.g., the requested entity ID 1102). For example, the active node 100 may obtain one or more entries from the distributed blockchain ledger 105A related to the patient that is subject to the data request of block 1000.

In some implementations, the active node 100 obtains one or more entries (e.g., encrypted data entries 500) stored in the distributed blockchain ledger 105A with the requested entity ID 1102. The one or more entries are illustrated as entity data block IDs 1306 in FIG. 13. In some implementations, as shown in block 1304, the active node 100 may also obtain external access keys that are associated with the entity data block IDs 1306. Recalling from FIG. 6, when a private entry was created to be stored in the secure database, the active node 100 created an external access key for the entry (e.g., external access key 600A in FIG. 6). In some implementations, when active node 100 obtains a single entry associated with the entity, then the active node 100 may obtain one associated external access key 600N. In some implementations, when the active node 100 obtained more than one entry associated with the entity, the active node 100 may obtain an external access key 600N for each of the entries. In some implementations, the quantity of external access keys 600N obtained corresponds to the quantity of entries (e.g., entity private data entries) obtained for the entity. In some implementations, the quantity of external access keys 600N obtained does not correspond to the quantity of entries obtained for the entity. In some implementations, the active node 100 may query the external access key data store 104 for stored external access keys that are associated with the entity data block IDs 1306. As shown in FIG. 13, the active node 100 may obtain one or more external access keys 600N that are stored as associated with the entity data block IDs 1306.

In some implementations, as illustrated in block 1308, the active node 100 may process one or more of the external access keys obtained at block 1304 to generate the system audit request 1300. For example, in some implementations, the active node 100 may send and store in the ephemeral external access key data store 103, the encrypted system access key 610N and the encrypted active node system access key 612N. In some implementations, the encrypted system access key 610N and the encrypted active node system access key 612N represent the encrypted system access key and the encrypted active node system access key for one of the external access keys 600N. In some implementations, the active node 100 may send and store in the ephemeral external access key data store 103, one or more of the encrypted system access keys 610N and the encrypted active node system access keys 612N. In some implementations, an associated pair of a stored encrypted system access key 610N and an encrypted active node system access key 612N form an ephemeral external access key 1311N. In some implementations, the active node 100 creates one or more ephemeral external access key 1311N based on the quantity of external access keys 600N (or quantities of pairs of stored encrypted system access keys 610N and an encrypted active node system access keys 612N). In some implementations, the active node 100 may send and store in the ephemeral external access key data store 103, each of the ephemeral external access keys 1311N for each of the obtained external access keys 600N. In some implementations, the encrypted system access keys and the encrypted active node system access keys (e.g., the ephemeral external access key 1311N) can be later retrieved (as shown in FIG. 16b) to enable the active node 100 to decrypt encrypted entries. In some implementations, the active node 100 may store a time to live (TTL) value in association with one or more of the ephemeral external access key 1311N stored in the ephemeral external access key data store 103 as shown at block 1310. In some implementations, the TTL is related to a TTL associated with the data request of block 1000. In some implementations, each of the ephemeral external access key 1311N stored in the ephemeral external access key data store 103 is stored in association with a TTL. In some implementations, the TTL defines how long the secure database system may use the stored encrypted system access keys and the encrypted active node system access keys stored in the ephemeral external access key data store 103 to access the requested data. In some implementations, the TTL is used to invalidate the stored encrypted system access keys and the encrypted active node system access keys after a predetermined time period for increased security and which invalidation causes the use of the internal audit controls for future data access requests for the same data as will be discussed herein (e.g., data access requests are recorded in the blockchain ledger of the secure database). For example, after the TTL period has expired for an ephemeral external access key 1311N, the active node 100 or another suitable device may delete the ephemeral external access key 1311N or otherwise render the ephemeral external access key 1311N unusable. As will be discussed below in connection with block 1606 in FIG. 16b, the active node 100 may generate replacement external access keys 600N to replace the used external access keys 600N.

In some implementations, processing the external access keys at block 1308 may also include creating the system audit request 1300 with one or more of the encrypted audit node system access keys 614N. In some implementations, the system audit request 1300 is the request sent to one or more audit nodes as shown in block 1010 of FIG. 10. In some implementations, the encrypted audit node system access keys 614N represents an encrypted audit node system access key for one of the external access keys 600N. In some implementations, the audit node access keys 1312 may include one or more of the encrypted audit node system access keys 614N. In some implementations, the audit node access keys 1312 may include each of the encrypted audit node system access keys obtained in external access keys 600N. In some implementations, the active node 100 may also generate an active node system signature 1314. In some implementations, the active node 100 may utilize the active node private key 1316 to create a digital signature of the audit node access keys 1312 using private key data signing as shown in block 309C. In some implementations, the active node system signature 1314 can be used by the audit nodes to verify that the active node 100 prepared the system audit request 1300 using the active node 100's public key.

FIG. 14 illustrates an example process of one of the audit nodes (e.g., audit node 101A-audit node 101N) generating an audit response after validating the entity data request as discussed in connection with block 1014 in FIG. 10. In some implementations, it should be appreciated that one or more of the audit nodes may perform the process described in FIG. 14. In some implementations, each of the audit nodes may perform the process described in FIG. 14. In some implementations, each of the audit nodes may attempt to perform the process described in FIG. 14, but one or more of the audit nodes may ignore or fail to generate an audit response where the audit node does not have the appropriate private key 1408N to decrypt the encrypted audit node system access key 614N as shown in block 901B. In some implementations, even where an audit node is unable to perform the decryption shown in block 901B, an audit node may still generate an audit response (block 1014 in FIG. 10) and transmit a response (block 1016 in FIG. 10) to the active node 100. In some such implementations where an audit node is unable to perform the public key decryption in block 901B, the audit node may still be able to perform the validation of block 1012 and provide feedback to the active node 100 whether or not the validation process passed or failed.

In some implementations, as shown in FIG. 14, an audit node (e.g., one or more of the audit nodes 101A-audit nodes 101N) may generate an audit response 1400 (a response that can be propagated to the active nodes and/or other audit nodes via blockchain communication). In some implementations, the audit response 1400 may include an encrypted audit response access key 1404, encrypted audit node system access key(s) 1416. The encrypted audit node system access key(s) 1416 may comprise one or more audit response encrypted audit node system access keys 1414. It should be appreciated that the quantity of audit response encrypted audit node system access keys 1414 may depend on how may encrypted audit nodes system access keys 614N the audit node was able to decrypt at block 901B. In some implementations, the audit response 1400 may include an audit node audit response signature 1418.

In some implementations, to generate an encrypted audit response access key 1404, an audit node may use public key encryption as shown at block 507D. An audit node may randomly generate an audit response access key 1402 (e.g., a cryptographic key). The audit node may obtain the requestor's public key 1408a (e.g., the requestor associated with the requestor entity ID 1104 in FIG. 11). The audit node may apply public key encryption to the randomly generated audit response access key 1402 using the requestor's public key 1408a to result in the encrypted audit response access key 1404. In some implementations, a requestor may have one or more pairs of public/private key pairs that are used for different encryption/decryption purposes in the secure database system. In some implementations, using different public/private key pairs may increase security of the security database system. One example is the requestor private key 1108b that is used in FIG. 11 to create the requestor data signature 1110. In some implementations, this requestor private key 1108b is part of a pair of public/private key pairs (e.g., 1108a and 1108b) that is different from the requestor's public key 1408a that is used to generate the encrypted audit response access key 1404. As will be discussed below, the requestor's public key 1408a is part of a key pair including the requestor's private key 1408b.

In some implementations, an audit node may use a more involved process to generate the encrypted audit node system access key(s) 1416. In some implementations, as shown in block 1406, an audit node may process one or more of the audit node access keys 1312 that were received from a system audit request 1300. For example, as shown in block 901B, an audit node may, for one or more of the encrypted audit node system access keys 614N, apply public key decryption using the audit node's private key 1408N. As noted above, an audit node may be limited to access to its own private key and may not have access to other audit node's private keys. As such, an audit node performing public key decryption at block 901B may not be able to decrypt an encrypted audit node system access key 614N if it was encrypted with a public key from a different audit node (e.g., at block 507C in FIG. 6). In some implementations, as shown in block 1410 and block 1412, if the decryption was not a success, the audit node may ignore that particular encrypted audit node access key. If there are additional audit node access keys to process from the system audit request 1300, the audit node may return to process the additional encrypted audit node access keys as shown in block 1406. If the decryption process was a success at block 1410, the decryption process will have revealed an unencrypted audit node system access key 609N. Recalling from FIG. 6, the unencrypted audit node system access key 609N is a portion of a randomly generated system access key 601. On its own, the unencrypted audit node system access key 609N cannot be used to decrypt data. However, once an unencrypted audit node system access key 609N is combined with the other portion of the randomly generated system access key 601 (e.g., the active node system access key 607), the combined resulting key can be used to access an entry requested by the requestor that was encrypted with the randomly generated system access key 601. Because the audit response is communicated over the blockchain network to the active node 100 and/or other audit nodes, the unencrypted audit node system access key 609N can be re-encrypted for transmission. In some implementations, the audit node may re-encrypt the unencrypted audit node system access key 609N with the randomly generated audit response access key 1402 using symmetric encryption, as shown at block 505C. As shown in FIG. 14, the resulting encrypted audit node system access key 609N is represented as audit response encrypted audit node system access key 1414. It should be appreciated that the audit node may generate one or more of the audit response encrypted audit node system access keys 1414, depending on what the audit node can decrypt at block 901B. The audit node may combine one or more of the audit response encrypted audit node system access keys 1414 to form the encrypted audit node system access key(s) 1416. It should be appreciated that different audit nodes may form different audit responses based on what audit node access keys the audit nodes were able to decrypt at block 901B. In some implementations, as shown in audit response 1400, as with many of the entries in the in the secure database, the audit node may generate a digital signature to form the audit node audit response signature 1418. In some implementations, the audit node audit response signature 1418 can be used to verify the audit node prepared the audit response (not shown). In some implementations, the audit response 1400 can be communicated back to the active node 100 and/or to other audit nodes via blockchain communication (e.g., added to the blockchain ledger 105A-105N).

Figure 15:
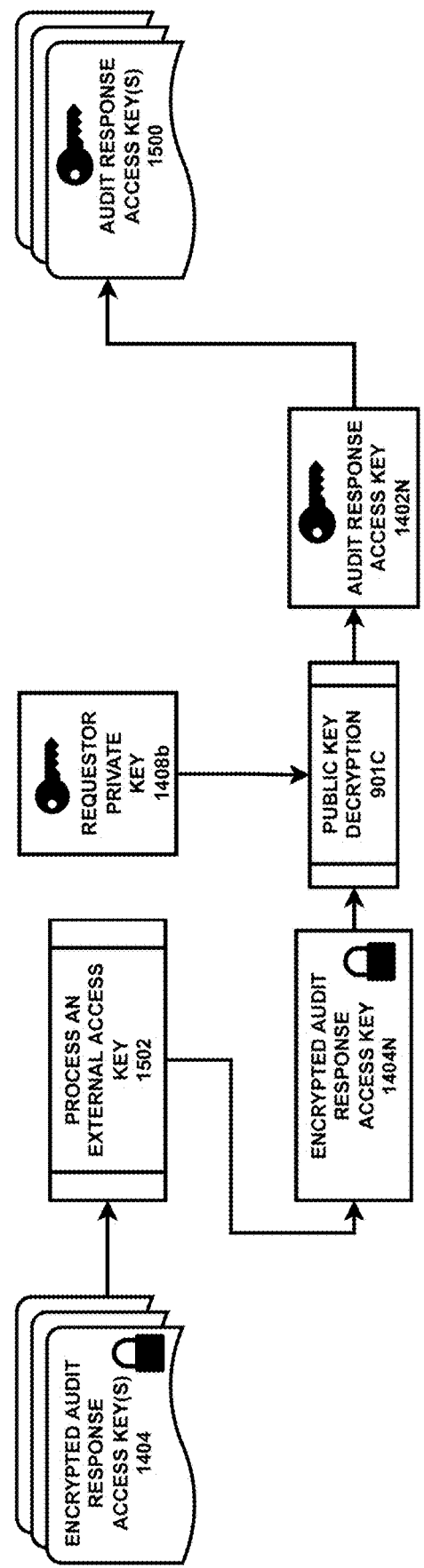
FIG. 15 is a flowchart of a method for decrypting access keys in a secure database according to some implementations of the disclosure.

FIG. 15 illustrates an example process of the web application server 109 decrypting audit response access keys 1404 provided in an audit response 1400 as discussed in connection with block 1020 in FIG. 10. It should be appreciated that in some implementations, other devices or systems may decrypt the access keys provided in an audit response 1400. As discussed in block 1016 in FIG. 10, the active node 100 may have received one or more audit responses 1400 from the one or more audit nodes which included encrypted audit response access keys 1404. The active node 100 may transmit one or more of the encrypted audit response access keys 1404 to the web application server 109 to decrypt these audit response access keys 1404. It should be appreciated that in some implementations, there may be one or more encrypted audit response access keys 1404. In some implementations, the quantity of encrypted audit response access keys 1404 depends on the number of audit nodes that sent an audit response (e.g., block 1016 in FIG. 10) to the active node 100. In some implementations, the process begins at block 1502, where the web application server 109 processes at least one encrypted external access key 1404 (e.g., encrypted external access key 1404N). For example, the web application server 109 may execute public key decryption as shown in block 901C on at least one encrypted external access key 1404 to generate an audit response access key 1402N. The web application server 109 may obtain the requestor's private key 1408b (that is associated with public key 1408a—public key/private key pair) to perform the decryption. In some implementations, if the web application server 109 determines that there are additional encrypted audit response access keys to decrypt, the web application server 109 may perform the public key decryption process in block 901C until one or more of the encrypted audit response access keys 1404 have been decrypted. The collection of decrypted audit response access keys 1402N are represented as a collection of audit response access keys 1500. It should be appreciated that in some implementations, the web application server 109 may perform the decryption in block 901B in series for one or more of the encrypted audit response access keys 1404. It should be appreciated that in some implementations, the web application server 109 may perform the decryption in block 901B in parallel for one or more of the encrypted audit response access keys 1404. In some implementations, the web application server 109 may transmit the collection of audit response access keys 1500 to the active node 100.

Figure 16A:
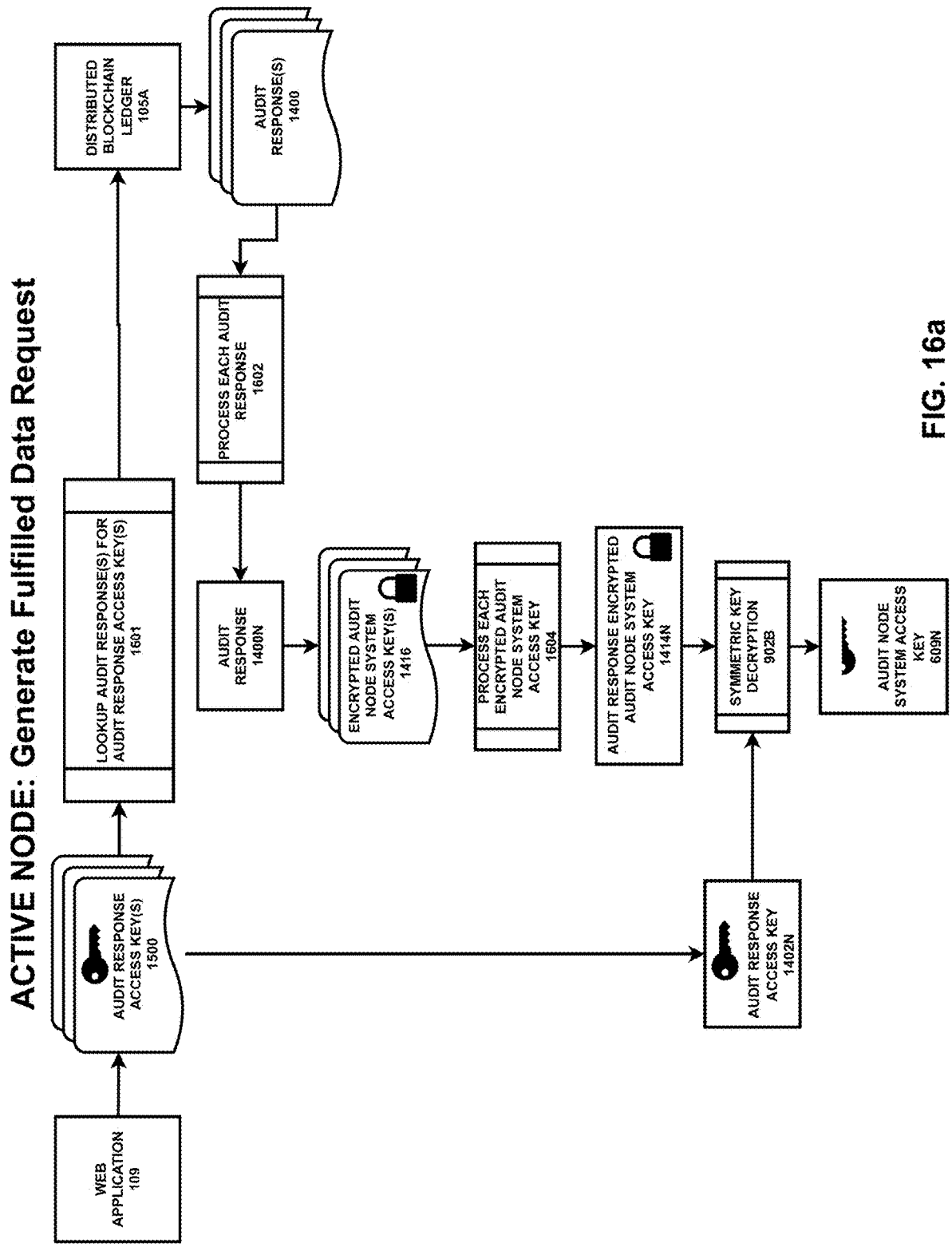
FIG. 16*a* and FIG. 16*b* are flowcharts of a method for generating a fulfilled data request according to some implementations of the disclosure.
Figure 16B:
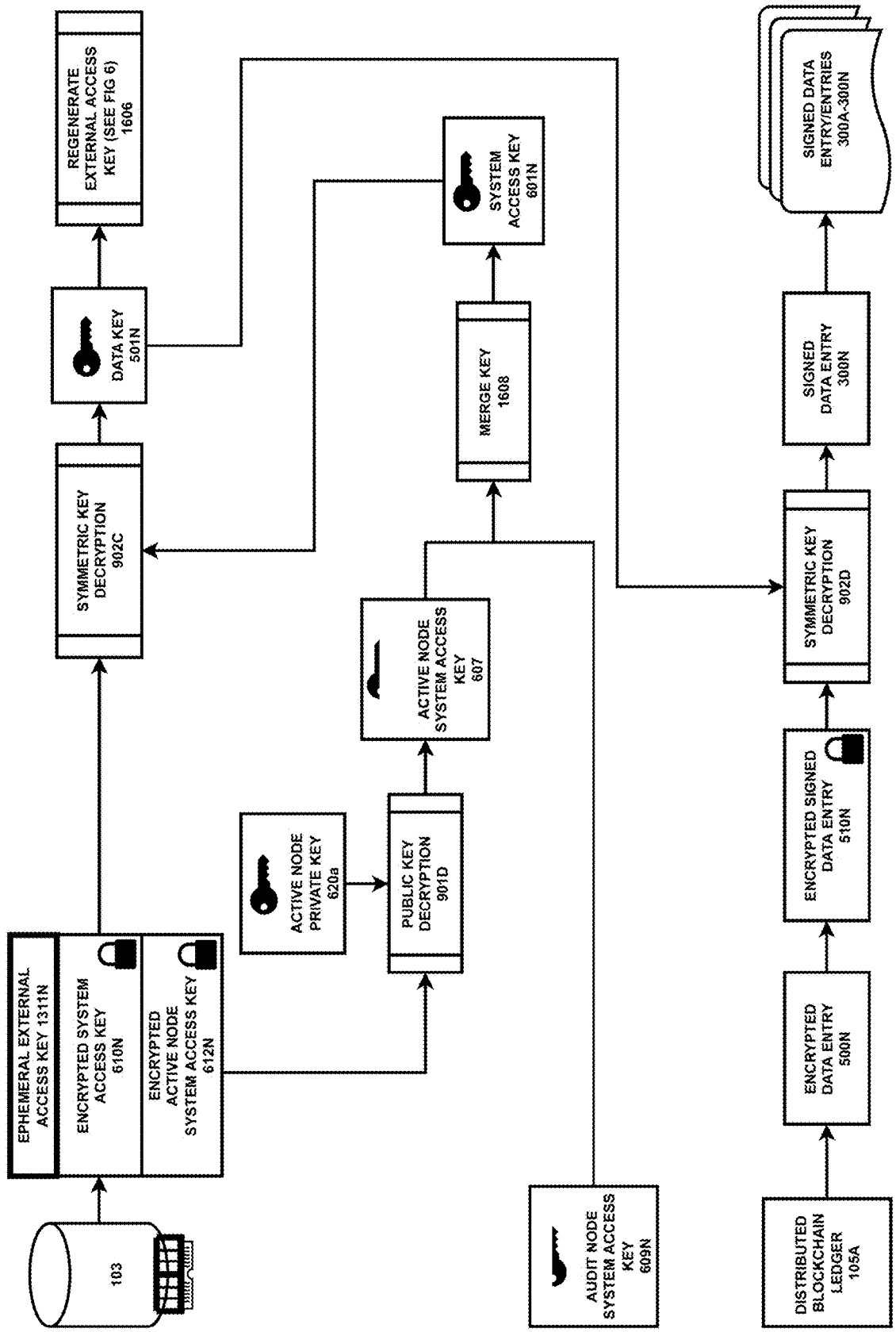

FIG. 16a and FIG. 16b illustrate example processes of the active node 100 generating the fulfilled data request as discussed in connection with block 1024 in FIG. 10. In some implementations, as will be described herein, fulfilling the data request may include using one or more audit nodes to decrypt data in combination with data stored at the active node 100 to unlock and recombine split encryption keys, which enable the active node 100 to ultimately unlock one or more entries that make up the entity record of the data request. For example, the active node 100 will enable the patient's records to be decrypted and sent to the medical insurance company that request access to the patient's records in block 1000 of FIG. 10.

In some implementations, the process shown in FIG. 16a relates to decrypting one or more audit node system access key(s) 609N (e.g., audit node system access keys 609 that were created from a split at block 605 in FIG. 6 from a randomly generated system access key 601).

In some implementations, the process may start when the active node 100 receives the audit response access keys 1500 decrypted from the web application server 109 illustrated in FIG. 15. In some implementations, the active node 100 may query for the related audit responses that correspond with the audit response access key(s) 1500 at block 1601. The active node 100 may obtain related audit response(s) 1400 from the distributed blockchain ledger 105A (e.g., audit node 101A wrote its audit response 1400 to a new block of distributed blockchain ledger 105B and the distributed blockchain ledger 105A is updated based the change to the distributed blockchain ledger 105B). As shown in block 1602, the active node 100 may process the audit response 1400N. In some implementations, where one or more audit nodes (audit nodes 101A-audit nodes 101N) transmit audit responses (block 1016 in FIG. 10) to the active node 100, the active node 100 may process these audit responses 1400 in series or in parallel. Referring back to FIG. 14, an audit response 1400N may include the encrypted audit node system access key(s) 1416. As discussed in FIG. 14, encrypted audit node system access key(s) 1416 may comprise one or more audit response encrypted audit node system access keys 1414N. As such, as shown in block 1604, the active node 100 may process the encrypted audit node system access key(s) 1416 by selecting an audit response encrypted audit node system access keys 1414N from the encrypted audit node system access key(s) 1416 for decryption.

In some implementations, as shown in FIG. 16a, the active node 100 may perform symmetric key decryption at block 902B on the selected audit response encrypted audit node system access keys 1414N to reveal a partial audit node system access key 609N. For example, for a particular audit response encrypted audit node system access key 1414N, the active node 100 may select an audit response access key 1402N (e.g., from the collection of audit response access keys 1500) that corresponds with the audit node that created the particular audit response encrypted audit node system access key 1414N and perform the symmetric key decryption at block 902B to result in a partial audit node system access key 609N. In some implementations, if there are more than one audit response encrypted audit node system access keys in the encrypted audit node system access key(s) 1416, then the decryption process at block 902B can be repeated for one or more of the audit response encrypted audit node system access keys and/or for each of the audit response encrypted audit node system access key. In some implementations, the active node 100 may perform the decryption process for multiple audit response encrypted audit node system access keys in block 902B in serial and/or in parallel. In some implementations, the result from the process described in FIG. 16a is one or more decrypted audit node system access keys 609N. In some implementations, the process described in FIG. 16a is repeated one or more times (e.g., for the other received audit responses 1400).

In some implementations, these decrypted audit node system access keys 609N can be used in the process described in FIG. 16b to decrypt or unlock the entries associated with the entity requested in the data request of block 1000. In some implementations, the quantity of audit node system access key(s) 609N that the active node 100 decrypts may depend on the quantity of audit response encrypted audit node system access key 1414N that exist for the data request (e.g., the data request of an entity from block 1000 in FIG. 10).

FIG. 16b illustrates a continuation of reassembling an encryption key that ultimately enables the active node 100 to decrypt entries associated with the entity requested in the data request of block 1000. As noted in FIG. 16a, one or more audit node system access keys 609N may have been decrypted. In some implementations, the process in FIG. 16b can be repeated for one or more of the audit node system access keys 609N. In some implementations, the active node 100 may retrieve an ephemeral external access key 1311N that stores an encrypted active node system access key 612N, where the encrypted active node system access key 612N is associated with audit node system access key 609N (e.g., when decrypted, the encrypted active node system access key 612N is the active node system access key 607 that pairs with the audit node system access key 609N, which was split at block 605 in FIG. 6). The active node 100 may decrypt the encrypted active node system access key 612N using public key decryption as shown in block 901D. The public key decryption in block 901D may use the active node private key 620a because the encrypted active node system access key 612N was originally encrypted using the active node public key 620 (e.g., the public/private key pair associated with the active node 100). As shown in the block 1608, the active node 100 may merge the now decrypted associated pair of the active node system access key 607 and the audit node system access key 609N to reform a complete system access key 601N (e.g., which corresponds to a randomly generate system access key 601 demonstrated in FIG. 6). In some implementations, the active node 100 may use the system access key 601N to perform symmetric key decryption as shown at block 902C. The active node 100 may decrypt the encrypted system access key 610N with the system access key 601N. The resulting decrypted data key 501N corresponds to the randomly generated data key 501 that was used to encrypt the signed data entry 300 in FIG. 5. With the data key 501N decrypted, the active node 100 may obtain an associated encrypted data entry 500N (e.g., which correspond to the encrypted data entry 500) from the distributed blockchain ledger 105A. The active node 100 may obtain the encrypted signed data entry 510N from the encrypted data entry 500N and perform symmetric key decryption as shown in block 902D. The active node 100 may use the data key 501N to decrypt the encrypted signed data entry 510N (e.g., because 501N was originally used to encrypt the signed data entry 510N). As a result of the decryption, the active node 100 can obtain an unencrypted signed data entry 300N (e.g., which corresponds to a signed data entry 300 as noted in FIG. 3). In some implementations, the active node 100 may perform the process shown in FIGS. 16a and 16b one or more times, depending on the number of entries retrieved that correspond to an entity that was part of the data request. In some implementations, the active node 100 may transmit the one or more decrypted entries (e.g., decrypted signed data entries 300N) to the web application server 109, as shown in block 1026 of FIG. 10, for further processing and to provide to the requestor. In some implementations, as shown in block 1606, after the data key 501N is used to decrypt the encrypted signed data entry 510N, the active node 100 may re-execute the process discussed in FIG. 6 to re-encrypt the data key 501N and again distribute the decryption process of 501N to one or more of the audit nodes.

It should be appreciated that a secure database incorporating one or more of the features discussed above provides secure data management in a de-centralized manner over one or more blockchain nodes (e.g., active node 100 and/or audit nodes 101A-101N and/or blockchain nodes 114). In some implementations, the secure database can be configured so that one or more entries in the secure database can be separately encrypted and a single master key cannot be used to unlock all entries in the secure database. In some implementations, secure database causes blockchain logging as part of some of the entries write and entry read procedures. In some implementations, auditability of read and write activities on the secure database can be built in at an entry level, rather than layered on top. For example, in some implementations, the secure database can be structured such that when writing one or more entries to the secure database or reading the one or more entries from the secure database, the read and/or write activities are performed through blockchain communication. Performing read and/or write activities through blockchain communication causes the read and/or writes to be written to the distributed blockchain ledger (e.g., distributed blockchain ledger 105A and/or distributed blockchain ledger 105N). Thus, in some implementations, when the read and write procedures are written to the distributed blockchain ledger, these reads and writes can become immutable as part of the blockchain. In some implementations, active nodes can be structured to function with audit nodes to distribute a portion of the decryption process for entries to access nodes and to cause read access for entries to be written to the blockchain ledger. In some such situations, an active node may not function without at least one audit node because some of the data encrypted in the active node cannot be decrypted without at least one audit node. In some implementations, where the active node works with audit nodes to decrypt stored entries, the secure database is well protected from offline attacks because even if an attacker obtained the distributed blockchain ledger (e.g., which stores encrypted entries), the attacker may need certain data elements from one or more audit nodes to decrypt the entries on the blockchain ledger. In some implementations, individual entries in the secure database can be secured such that accessing one entry in the secure database does not necessarily give access to another entry in the secure database.

In some aspects, the techniques described herein relate to a computer implemented method of operating a secure database system, including: receiving a request to retrieve an encrypted private data record at an active node of a blockchain network from an external entity that does not own the private data record; validating the request to retrieve the encrypted private data record at the active node; generating a system audit request at the active node; transmitting, from the active node, the system audit request to a plurality of audit nodes; receiving, at the active node, a response from an audit node of the plurality of audit nodes, wherein the response includes at least a portion of a first decryption key that can be used in the decryption of the requested encrypted private data record; decrypting the encrypted private data record at the active node using a second decryption key, wherein the decryption is based on consensus authorization with the plurality of nodes; and transmitting the decrypted private data record to a requesting system.

In some aspects, the techniques described herein relate to the computer implemented method, wherein, after the decrypting the encrypted private data record through the external entity data request, the method further comprises: randomly generating a new system access key; encrypting, with the system access key, a data key used to encrypt the private data record resulting in an encrypted system access key; splitting the system access key into at least two portions; encrypting at least one portion of the split system access key with a public key of the active node; encrypting at least a second portion of the split system access key with a public key of a randomly selected audit node of the plurality of audit nodes; forming an external access key using the encrypted at least one portion of the split system access key, the encrypted at least a second portion of the split system access key, and the encrypted system access key; storing the external access key in a datastore that is separate from a datastore used to store the encrypted private data record, wherein the external access key can be used in the decryption of the encrypted private data record in a subsequent request to access the encrypted private data record; and deleting a prior external access key that is replaced by the external access key.

In some aspects, the techniques described herein relate to the computer implemented method, wherein the plurality of audit nodes and the active node form part of a blockchain network.

In some aspects, the techniques described herein relate to the computer implemented method, wherein the system audit request is transmitted to the plurality of audit nodes through blockchain communication.

In some aspects, the techniques described herein relate to the computer implemented method, wherein the request to retrieve the encrypted private data record is logged in a datastore.

In some aspects, the techniques described herein relate to the computer implemented method, wherein the request to retrieve the encrypted private data record is logged in a blockchain ledger.

In some aspects, the techniques described herein relate to the computer implemented method of the foregoing sentence, wherein the blockchain ledger is mirrored on the active node and at least one of the plurality of audit nodes.

In some aspects, the techniques described herein relate to the computer implemented method, wherein the response from the audit node is transmitted through blockchain communication, wherein the blockchain communication includes writing the response from the audit node to a blockchain ledger that is mirrored on at least the audit node and the active node.

In some aspects, the techniques described herein relate to the computer implemented method of the foregoing sentence, wherein the blockchain ledger can be reviewed to determine attempts to access the encrypted private data record.

In some aspects, the techniques described herein relate to the computer implemented method, wherein the plurality of the audit nodes attempt to process the system audit request and decrypt an audit node access key using private keys associated with respective audit nodes of the plurality of audit node, wherein an audit node of the plurality of audit nodes that successfully decrypts the audit node access key is the audit node whose associated public key was used to encrypt the audit node access key.

In some aspects, the techniques described herein relate to the computer implemented method, wherein the at least a portion of a key is merged with another portion of the key to form a complete key, wherein the complete key is used to decrypt a second decryption key, and wherein the second decryption key is used to decrypt the requested private data record.

In some aspects, the techniques described herein relate to the computer implemented method, wherein the response from the audit node of the plurality of audit nodes further includes the portion of the first decryption key that has been encrypted with a public key associated with the external entity, to prevent $3^{rd}$ parties from decrypting the portion of the first decryption key without the private key of the external entity.

In some aspects, the techniques described herein relate to a system including a processor, and a storage medium storing instructions, which when executed by the processor, causes the system to carry out the method of any one of the prior 12 paragraphs.

In some aspects, the techniques described herein relate to a machine-readable medium carrying machine readable instructions, which when executed by a processor of a machine, causes the machine to carry out the method of any one of the prior 13 paragraphs.

The present disclosure is not to be limited in terms of the particular implementations described in this application, which are intended as illustrations of various aspects. Moreover, the various disclosed implementations can be interchangeably used with each other, unless otherwise noted. Many modifications and variations can be made without departing from its spirit and scope, as will be apparent to those skilled in the art. Functionally equivalent methods and apparatuses within the scope of the disclosure, in addition to those enumerated herein will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular implementations only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

A number of implementations of the invention have been described. Various modifications may be made without departing from the spirit and scope of the invention. For example, various forms of the flow charts shown above may be used, with steps re-ordered, added, or removed. Accordingly, other implementations are within the scope of the following claims.

The invention claimed is:

1. An active node of a secure database system, comprising:
   at least one processor; and
   at least one memory that stores computer executable instructions, wherein, when the computer executable instructions are executed by the at least one processor, the at least one processor are configured to:
   receive a request to store a private data record;
   encrypt the private data record with a first randomly generated data key to result in an encrypted private data record;
   encrypt the first randomly generated data key using a first type of encryption and a second randomly generated data key to result in a first encrypted system access key;
   encrypt the second randomly generated data key using a second type of encryption to result in at least two second encrypted system access keys, wherein the second type of encryption uses a public key from a randomly selected node of a plurality of nodes that, with the active node, form part of the secure database system, wherein the at least two second encrypted system access keys comprise an encrypted active node system access key and an encrypted audit node system access key, and wherein the encrypted active node system access key and the encrypted audit node system access key contain different portions of the second randomly generated data key;

transmit the encrypted private data record to a plurality of nodes for validation;

add the encrypted private data record to a datastore in the node based on validating that the encrypted private data record can be written to a datastore and receiving messages from the plurality of nodes that the encrypted private data record can be written to the datastore, wherein the datastore mirrors other datastores associated with respective nodes of the plurality of nodes;

store the first encrypted system access key and the at least one second encrypted system access key in an external access key database; and enable decryption access to the encrypted private data record using the at least one second encrypted system access key based on consensus authorization with the plurality of nodes.

2. The active node of the secure database system of claim 1, wherein the datastore is a blockchain ledger.

3. The active node of the secure database system of claim 1, wherein the encrypted active node system access key is encrypted with a public key associated with the active node.

4. The active node of the secure database system of claim 1, wherein the first encrypted system access key, the encrypted active node system access key, and the encrypted audit node system access key comprise an external access key, wherein the external access key is stored in the external access key database.

5. The active node of the secure database system of claim 4, wherein the external access key database is separate from the datastore, wherein records are permitted to be deleted from the external access key database, and wherein entries in the datastore are not permitted to be deleted from the datastore.

6. The active node of the secure database system of claim 1, wherein the request to store the private data record is logged.

7. The active node of the secure database system of claim 4, wherein the request to store the private data record is logged in the datastore, wherein the datastore is a blockchain ledger.

8. A method of operating a secure database system, comprising:

receiving a request to store a private data record; encrypting the private data record with a first randomly generated data key to result in an encrypted private data record;

encrypting the first randomly generated data key using a first type of encryption and a second randomly generated data key to result in a first encrypted system access key;

encrypting the second randomly generated data key using a second type of encryption to result in at least an encrypted active node system access key and an encrypted audit node system access key, wherein the second type of encryption uses a public key from a randomly selected node of a plurality of nodes that, with the active node, form part of the secure database system, wherein the encrypted active node system access key and the encrypted audit node system access key contain different portions of the second randomly generated data key;

transmitting the encrypted private data record to a plurality of nodes for validation;

adding the encrypted private data record to a datastore in the node based on validating that the encrypted private data record can be written to a datastore and receiving messages from the plurality of nodes that the encrypted private data record can be written to the datastore, wherein the datastore mirrors other datastores associated with respective nodes of the plurality of nodes;

storing the first encrypted system access key and the at least one second encrypted system access key in an external access key database;

and enabling decryption access to the encrypted private data record using the at least one second encrypted system access key based on consensus authorization with the plurality of nodes.

9. The method of operating the secure database system of claim 8, wherein the datastore is a blockchain ledger.

10. The method of operating the secure database system of claim 8, wherein the encrypted active node system access key is encrypted with a public key associated with the active node.

11. The method of operating the secure database system of claim 8, wherein the first encrypted system access key, the encrypted active node system access key, and the encrypted audit node system access key comprise an external access key, wherein the external access key is stored in the external access key database.

12. The method of operating the secure database system of claim 11, wherein the external access key database is separate from the datastore, wherein records are permitted to be deleted from the external access key database, and wherein entries in the datastore are not permitted to be deleted form the datastore.

13. The method of operating the secure database system of claim 8, wherein the request to store the private data record is logged.

14. The method of operating the secure database system of claim 11, wherein the request to store the private data record is logged in the datastore, wherein the datastore is a blockchain ledger.

* * * * *